US008878907B2

(12) United States Patent
Awazu et al.

(10) Patent No.: US 8,878,907 B2
(45) Date of Patent: Nov. 4, 2014

(54) MONOCULAR STEREOSCOPIC IMAGING DEVICE

(71) Applicant: FUJIFILM Corporation, Tokyo (JP)

(72) Inventors: Kouhei Awazu, Saitama (JP); Takashi Aoki, Saitama (JP); Hiroshi Endo, Saitama (JP); Hirofumi Horii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 130 days.

(21) Appl. No.: 13/730,540

(22) Filed: Dec. 28, 2012

(65) Prior Publication Data
US 2013/0141539 A1 Jun. 6, 2013

Related U.S. Application Data

(63) Continuation of application No. PCT/JP2011/061804, filed on May 24, 2011.

(30) Foreign Application Priority Data

Jun. 29, 2010 (JP) ................. 2010-147891

(51) Int. Cl.
H04N 13/02 (2006.01)
G03B 17/00 (2006.01)
G03B 35/08 (2006.01)
G03B 9/02 (2006.01)
G03B 35/00 (2006.01)

(52) U.S. Cl.
CPC ............ G03B 35/00 (2013.01); H04N 13/0296 (2013.01); G03B 35/08 (2013.01); G03B 9/02 (2013.01); H04N 13/0225 (2013.01); H04N 13/0271 (2013.01); H04N 13/0235 (2013.01); H04N 13/0217 (2013.01)
USPC .............................. 348/46; 396/72

(58) Field of Classification Search
None
See application file for complete search history.

(56) References Cited

U.S. PATENT DOCUMENTS 6,233,003 B1  5/2001  Ono
2003/0083551 A1  5/2003  Takahashi (Continued)

FOREIGN PATENT DOCUMENTS

JP  8-317429 A  11/1996
JP  10-42314 A  2/1998

(Continued)

OTHER PUBLICATIONS

PCT/IPEA/408: Written Opinion dated Jun. 19, 2012, issued in PCT/JP2011/061804.

(Continued)

Primary Examiner — Joseph Ustaris
Assistant Examiner — Zhubing Ren
(74) Attorney, Agent, or Firm — Birch, Stewart, Kolasch & Birch, LLP

(57) ABSTRACT

The monocular stereoscopic imaging device according to one aspect of the presently disclosed subject matter includes: an imaging optical system including a zoom lens and a diaphragm; a pupil dividing unit configured to divide a light flux having passed through a imaging optical system into multiple light fluxes; an imaging unit configured to receive the multiple light fluxes, so as to continuously acquire a left-eye image and a right-eye image; and a controlling unit configured to control a zoom lens driving unit to move the zoom lens in accordance with an instruction of changing the focus distance, and configured to control the diaphragm driving unit to maintain at a substantially constant level a stereoscopic effect of the left-eye image and the right-eye image three-dimensionally displayed on a display unit before and after the zoom lens is moved.

12 Claims, 17 Drawing Sheets

(56) References Cited

U.S. PATENT DOCUMENTS

| | | |
|---|---|---|
| 2006/0135866 A1 | 6/2006 | Namii et al. |
| 2006/0187312 A1 | 8/2006 | Labaziewicz et al. |
| 2006/0275025 A1 | 12/2006 | Labaziewicz et al. |
| 2008/0024595 A1* | 1/2008 | Garcia Galarriaga .......... 348/46 |
| 2010/0245546 A1 | 9/2010 | Kuroki |

FOREIGN PATENT DOCUMENTS

| | | |
|---|---|---|
| JP | 2003-222804 A | 8/2003 |
| JP | 2005-20559 A | 1/2005 |
| JP | 2005-159559 A | 6/2005 |
| JP | 2006-158452 A | 6/2006 |
| JP | 2008-530954 A | 8/2008 |
| JP | 2010-81580 A | 4/2010 |
| JP | 2011-257770 A | 12/2011 |

OTHER PUBLICATIONS

PCT/IPEA/409: International Preliminary Report on Patentabililty (Chapter II), dated Aug. 9, 2012, issued in PCT/JP2011/061804.

PCT/ISA/210: International Search Report mailed on Jul. 12, 2011, issued in PCT/JP2011/061804.

PCT/ISA/237: Written Opinion of the International Searching Authority mailed on Jul. 12, 2011, issued in PCT/JP2011/061804.

Written Reply filed on Jan. 20, 2012, in the corresponding PCT/JP2011/061804.

Written Reply filed on Jul. 23, 2012, in the corresponding PCT/JP2011/061804.

* cited by examiner (MAIN PIXELS)

(SUBPIXELS)

FIG.5A NORMAL PIXEL
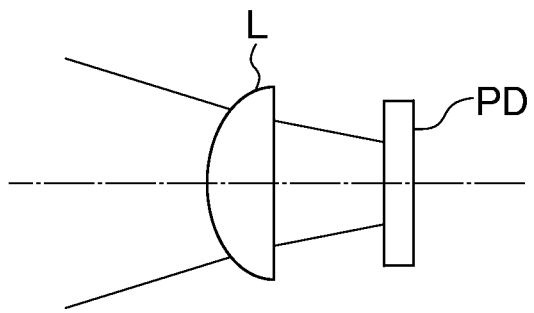
FIG.5B PHASE-DIFFERENCE PIXEL
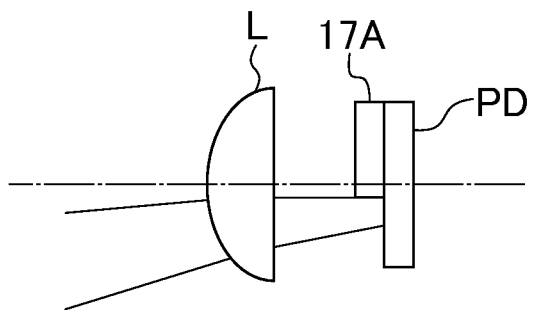
FIG.5C PHASE-DIFFERENCE PIXEL
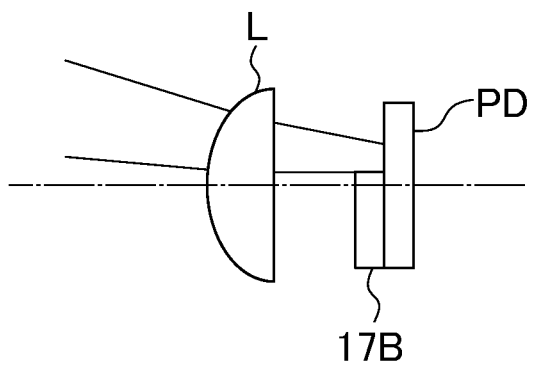

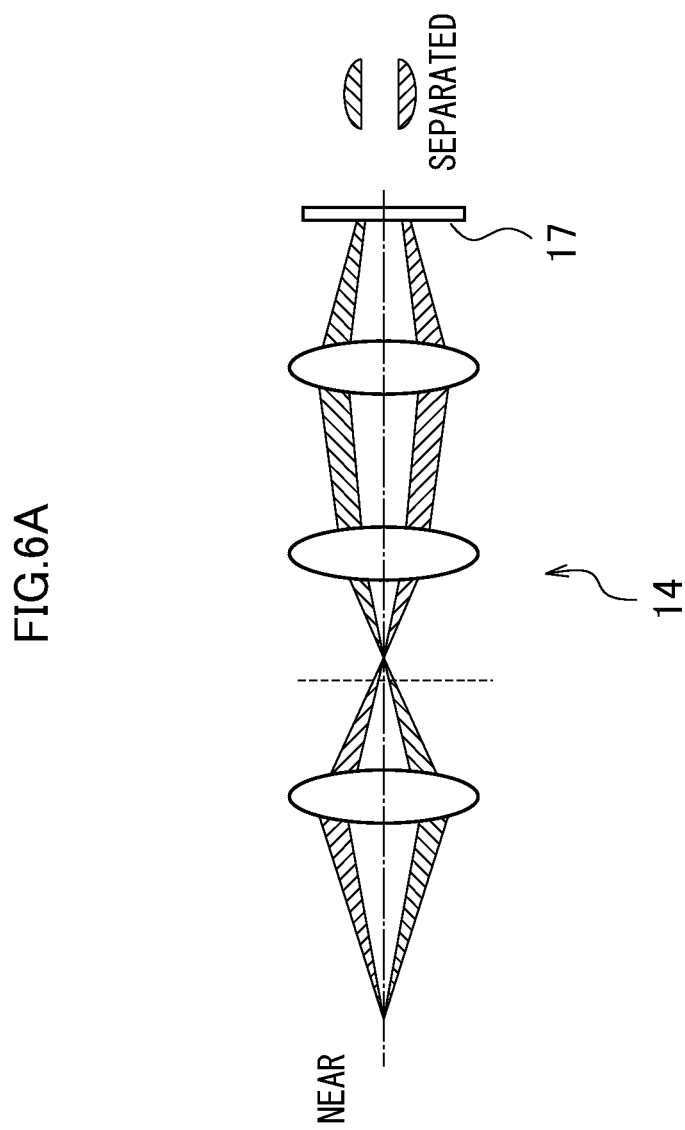

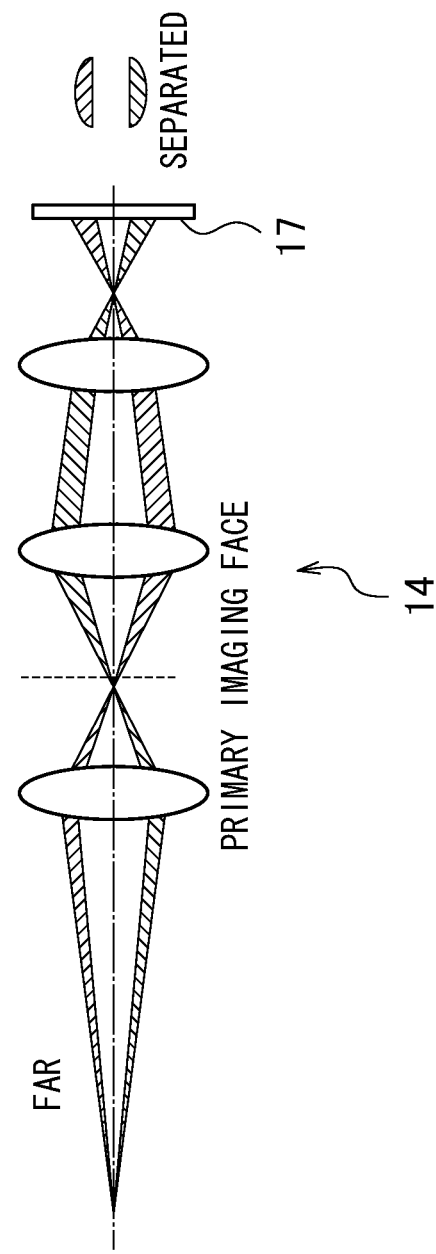

PRIMARY
IMAGING FACE
17

PRIMARY
IMAGING FACE
17

MONOCULAR STEREOSCOPIC IMAGING DEVICE

CROSS-REFERENCE TO RELATED APPLICATIONS

This application is a PCT Bypass continuation application and claims the priority benefit under 35 U.S.C. §120 of PCT Application No. PCT/JP2011/061804 filed on May 24, 2011 which application designates the U.S., and also claims the priority benefit under 35 U.S.C. §119 of Japanese Patent Application No. 2010-147891 filed on Jun. 29, 2010, which applications are all hereby incorporated by reference in their entireties.

BACKGROUND OF THE INVENTION

1. Field of the Invention

The presently disclosed subject matter relates to a monocular stereoscopic imaging device, and more particularly to a technique for imaging each image of an object having passed through different areas in the right and left direction of a taking lens on an image sensor, so as to acquire an image for a left-eye and an image for a right-eye.

2. Description of the Related Art

Japanese Patent Application Laid-Open No. 10-042314 discloses a parallax image input device capable of photographing a parallax image using a single taking lens and an image sensor.

In a monocular 3D camera using such a single taking lens, and dividing a luminous flux having passed through the single taking lens into multiple luminous fluxes (pupil division) so as to photograph a parallax image (referred to as a pupil division system, hereinafter), the parallax at a focus position becomes 0, and parallaxes occur at non-focus positions depending on the degree of each defocus. When a focus lens is moved, and the focus point is changed, the parallax is also changed depending on the degree of its defocus (referred to as a degree of parallax, hereinafter).

SUMMARY OF THE INVENTION

When photographing an image for a three-dimensional display using a monocular 3D camera, a user can monitor how the image has been photographed by three-dimensionally displaying an image for a left-eye (referred to as a left-eye image, hereinafter) and an image for a right-eye (referred to as a right-eye image, hereinafter).

In a monocular 3D camera employing the pupil division system, there occurs a parallax on an object located at a position out of focus (position out of focus in a normal 2D camera). In the monocular 3D camera employing the pupil division system, an object in focus has a parallax of 0. On the other hand, an object located more frontward (closer to the 3D camera) than the object in focus appears to be popping out from a display plane toward an observer (user), and an object located more backward than the object in focus (farther from the 3D camera) appears to be located backward from the display plane to the user.

Under a condition in which the degree of defocus is increased on the 2D camera, the degree of parallax is greater on the monocular 3D camera. When photographing an object located at a position out of focus with a 2D camera, a shorter focus distance (wide-angle side) makes the depth of field deeper so that the degree of defocus is decreased; and a longer focus distance (telephoto side) makes the depth of field shallower so that the degree of defocus is increased. Specifically, on the monocular 3D camera, when a zooming operation is carried out by shifting a zoom lens in the direction of decreasing the focus distance (direction from the telephoto end toward the wide-angle end), the parallax in the divergence direction (direction of retreating from the display plane) and the excessive parallax (direction of popping out from the display screen) (referred to as a stereoscopic effect, hereinafter) are decreased, and the zoom operation in the direction of increasing the focus distance (direction from the wide-angle end toward the telephoto end) increases the stereoscopic effect.

Consequently, the zoom operation while photographing moving images or live view images (through images) may cause uncomfortable feeling to a photographer due to variation in stereoscopic effect. This is a typical phenomenon of the monocular 3D camera using the pupil division system.

However, Japanese Patent Application Laid-Open No. 10-042314 describes no parallax adjustment.

Japanese Patent Application Laid-Open No. 2010-81010 describes a technique of a three-dimensional display or a two-dimensional display using a smaller parallax during the zoom operation. This is directed to a technique of prevention of variation in the stereoscopic effect due to a difference in motors and mechanisms among various photographing units of a multi-lens 3D camera for photographing a parallax image using two imaging systems. Hence, it is difficult to apply this technique directly to the monocular 3D camera having a single photographing unit, and this technique cannot solve the problems resulted from the typical phenomenon of the monocular 3D camera.

An object of the presently disclosed subject matter, which has been made in view of circumstances described above, is to provide a monocular stereoscopic imaging device capable of maintaining a stereoscopic effect of a left-eye image and a right-eye image that are three-dimensionally displayed at a substantially constant level even if a zoom lens is moved while photographing through images or moving images using a monocular 3D camera, thereby reducing an uncomfortable feeling of a photographer.

A monocular stereoscopic imaging device according to a first aspect of the presently disclosed subject matter includes: an imaging optical system including a zoom lens and a diaphragm; a pupil dividing unit configured to divide a light flux having passed through the imaging optical system into multiple light fluxes; an imaging unit configured to receive the multiple light fluxes divided by the pupil dividing unit, so as to continuously acquire a left-eye image and a right-eye image; a zoom lens driving unit configured to move the zoom lens; a diaphragm driving unit for driving the diaphragm so as to change a degree of aperture of an aperture of the diaphragm; a display unit configured to recognizably display the left-eye image and the right-eye image as a three-dimensional image; a display controlling unit configured to three-dimensionally display on the display unit the left-eye image and the right-eye image continuously acquired; an input unit configured to input an instruction of changing a focus distance; and a controlling unit configured to control the zoom lens driving unit to move the zoom lens in accordance with the instruction of changing the focus distance input from the input unit, and configured to control the diaphragm driving unit to maintain at a substantially constant level a stereoscopic effect of the left-eye image and the right-eye image three-dimensionally displayed on the display unit before or after the zoom lens is moved.

The monocular stereoscopic imaging device according to the first aspect moves the zoom lens in accordance with the instruction of changing the focus distance, and drives the diaphragm so as to change the degree of aperture of the aperture, thereby maintaining at a substantially constant level a stereoscopic effect of the left-eye image and the right-eye image three-dimensionally displayed on the display unit before and after the zoom lens is moved. Accordingly, even if the zoom lens is moved while photographing moving images, the stereoscopic effect of the left-eye image and the right-eye image that are three-dimensionally displayed can be maintained at a substantially constant level, thereby reducing an uncomfortable feeling of a photographer. The description, substantially constant, represents a concept including that the stereoscopic effect is slightly varied because the stereoscopic effect cannot be perfectly maintained at a constant level when the driving steps of the diaphragm are limited (when the diaphragm cannot be continuously driven).

The monocular stereoscopic imaging device according to a second aspect of the presently disclosed subject matter is configured such that, in the first aspect, the controlling unit drives the diaphragm through the diaphragm driving unit so as to reduce the degree of aperture when the zoom lens is moved in a direction of increasing the focus distance through the zoom lens driving unit.

In the monocular stereoscopic imaging device according to the second aspect, when the zoom lens is moved in the direction of increasing the focus distance, the stereoscopic effect is increased; therefore, the stereoscopic effect is decreased by reducing the degree of aperture of the diaphragm. Accordingly, the stereoscopic effect can be maintained at a substantially constant level regardless of the variation of the focus distance.

The monocular stereoscopic imaging device according to a third aspect of the presently disclosed subject matter is configured such that, in the first or second aspect, the controlling unit drives the diaphragm through the diaphragm driving unit so as to increase the degree of aperture when the zoom lens is moved in a direction of decreasing the focus distance through the zoom lens driving unit.

In the monocular stereoscopic imaging device according to the third aspect, when the zoom lens is moved in the direction of decreasing the focus distance, the stereoscopic effect is decreased; therefore, the stereoscopic effect is increased by increasing the degree of aperture of the diaphragm. Accordingly, the stereoscopic effect can be maintained at a substantially constant level regardless of the variation of the focus distance.

The monocular stereoscopic imaging device according to a fourth aspect of the presently disclosed subject matter is configured such that, in any of the first to third aspects, the controlling unit controls the diaphragm driving unit to minimize the degree of aperture when the zoom lens is located at a telephoto end.

In the monocular stereoscopic imaging device according to the fourth aspect, when the zoom lens is located at the telephoto end, the zoom lens is moved only in the direction of decreasing the focus distance; therefore, the diaphragm can be controlled to minimize the degree of aperture. Accordingly, it is possible to prevent a difficulty in adjustment of the stereoscopic effect through the diaphragm.

The monocular stereoscopic imaging device according to a fifth aspect of the presently disclosed subject matter is configured such that, in any of the first to fourth aspects, the controlling unit controls the diaphragm driving unit to maximize the degree of aperture when the zoom lens is located at a wide-angle end.

In the monocular stereoscopic imaging device according to the fifth aspect, when the zoom lens is located at the wide-angle end, the zoom lens is moved only in the direction of increasing the focus distance; therefore, the diaphragm can be controlled to maximize the degree of aperture. Accordingly, it is possible to prevent a difficulty in adjustment of the stereoscopic effect through the diaphragm.

The monocular stereoscopic imaging device according to a sixth aspect of the presently disclosed subject matter is configured such that, in any of the first to fifth aspects, the diaphragm can be driven so as to change the degree of aperture in n steps (n is a natural number equal to or greater than 2); the zoom lens can be driven so as to change the focus distance in m steps (m is a natural number equal to or greater than 2), m being greater than the n; and the controlling unit controls the zoom lens driving unit and the diaphragm driving unit to reduce the aperture of the diaphragm by one stop before the zoom lens is moved when the instruction of changing the focus distance in the direction of increasing the focus distance is input through the input unit, and to reduce the aperture of the diaphragm by one stop every time the zoom lens is moved by a predetermined number of steps.

In the monocular stereoscopic imaging device according to the sixth aspect, when the diaphragm can be driven to change the degree of aperture in n steps (n is a natural number equal to or greater than 2), and it can be driven to change the focus distance in m steps (m is a natural number equal to or greater than 2) m being greater than the n, that is, when the aperture cannot be continuously varied, and the zoom lens has the number of the driving steps more than the number of the driving steps of the diaphragm, and when the instruction of changing the focus distance in the direction of increasing the focus distance, the aperture of the diaphragm is reduced by one stop before the zoom lens is moved, and this reduction by one stop of the aperture of the diaphragm is executed every time the zoom lens is moved by predetermined stops. When the number of the driving steps of the diaphragm is limited (the diaphragm cannot be driven continuously), it is impossible to perfectly maintain the stereoscopic effect at a constant level, thereby the stereoscopic effect is slightly varied; however, the zoom lens and the diaphragm are controlled in the above manner, thereby preventing the stereoscopic effect from being greater than the stereoscopic effect before the zoom lens is moved. Accordingly, it is possible to reduce an uncomfortable feeling of the photographer to be as small as possible.

The monocular stereoscopic imaging device according to a seventh aspect of the presently disclosed subject matter is configured such that, in the sixth aspect, the controlling unit limits the driving steps of the zoom lens to be the n steps of the m steps, and controls the zoom lens driving unit and the diaphragm driving unit to synchronously drive the diaphragm and the zoom lens.

In the monocular stereoscopic imaging device according to the seventh aspect, when the aperture cannot be continuously varied, and the zoom lens has the number of the driving steps more than the number of the driving steps of the diaphragm, the driving of the zoom lens is limited such that the zoom lens has the number of the driving steps equal to the number of the driving steps of the diaphragm, and the zoom lens and the diaphragm are synchronously driven. In this configuration, although the zooming becomes discontinuous, the slight variation of the stereoscopic effect can be prevented.

The monocular stereoscopic imaging device according to an eighth aspect of the presently disclosed subject matter is configured such that, in the sixth aspect, the monocular stereoscopic imaging device further includes a digital zoom unit configured to cut off predetermined areas from the left-eye image and the right-eye image, and configured to electronically change the focus distance, and the controlling unit controls the digital zoom unit to virtually change the focus distance through the digital zoom unit, instead of moving the zoom lens through the zoom lens driving unit.

In the monocular stereoscopic imaging device according to the eighth aspect, the focus distance is virtually varied by the digital zoom unit that cuts off predetermined areas from the left-eye image and the right-eye image, and electronically changing the focus distance. Accordingly, of two factors that affect the variation of the stereoscopic effect: (1) the variation of the stereoscopic effect due to variation of the incident light flux; and (2) the variation of the stereoscopic effect due to variation of the angle of view, it is possible to eliminate the factor (1). Consequently, in the case where the number of the driving steps of the diaphragm is smaller than that of the zoom lens, and thereby the slight variation of the stereoscopic effect is inevitable, it is possible to reduce an uncomfortable feeling of the photographer.

The monocular stereoscopic imaging device according to a ninth aspect of the presently disclosed subject matter is configured such that, in any of the first to eighth aspects, the monocular stereoscopic imaging device further includes a storage unit configured to store a relation between the degree of aperture of the aperture of the diaphragm and the focus distance, and the controlling unit controls the diaphragm driving unit based on the relation between the degree of aperture and the focus distance stored on the storage unit.

The monocular stereoscopic imaging device according to a tenth aspect of the presently disclosed subject matter is configured such that the monocular stereoscopic imaging device further includes a two-dimensional image generating unit configured to synthesize the left-eye image and the right-eye image when brightness of the left-eye image and the right-eye image is equal to or less than a predetermined value, so as to generate a two-dimensional image, the display unit can display the two-dimensional image, and the display controlling unit displays the generated two-dimensional image on the display unit when the two-dimensional image is generated by the two-dimensional image generating unit.

In the monocular stereoscopic imaging device according to the tenth aspect, when brightness of the left-eye image and the right-eye image is equal to or less than the predetermined value, that is, when the displayed three-dimensional image becomes dark, which deteriorates the visibility, the left-eye image and the right-eye image are synthesized so as to generate a two-dimensional image, and display this. Accordingly, it is possible to enhance the visibility. In addition, the stereoscopic effect becomes smaller in the two-dimensional image than in the three-dimensional image, thereby it is possible to reduce an uncomfortable feeling of the photographer due to the stereoscopic effect being increased.

According to the presently disclosed subject matter, it is possible to maintain, at a substantially constant level, the stereoscopic effect of the left-eye image and the right-eye image that are three-dimensionally displayed, even if the zoom lens is moved while photographing through images or moving images using the monocular 3D camera, thereby reducing an uncomfortable feeling of a photographer.

BRIEF DESCRIPTION OF THE DRAWINGS

FIG. 5A is an enlarged view of a main part of FIG. 4 (normal pixel with no pupil division);

FIG. 5B is an enlarged view of a main part of FIG. 4 (phase-difference pixel with pupil division);

FIG. 5C is an enlarged view of a main part of FIG. 4 (phase-difference pixel with pupil division);

FIG. 6A is a drawing illustrating a separated state of an image imaged on an image sensor with a focus point in front of an object;

FIG. 6C is a drawing illustrating a separated state of an image imaged on the image sensor with the focus point in back of the object;

DETAILED DESCRIPTION OF THE EMBODIMENTS

Hereinafter, description will be provided on embodiments of a monocular stereoscopic imaging device according to the presently disclosed subject matter with reference to the accompanying drawings.

First Embodiment

[Outline of Configuration of Imaging Device]

Figure 1:
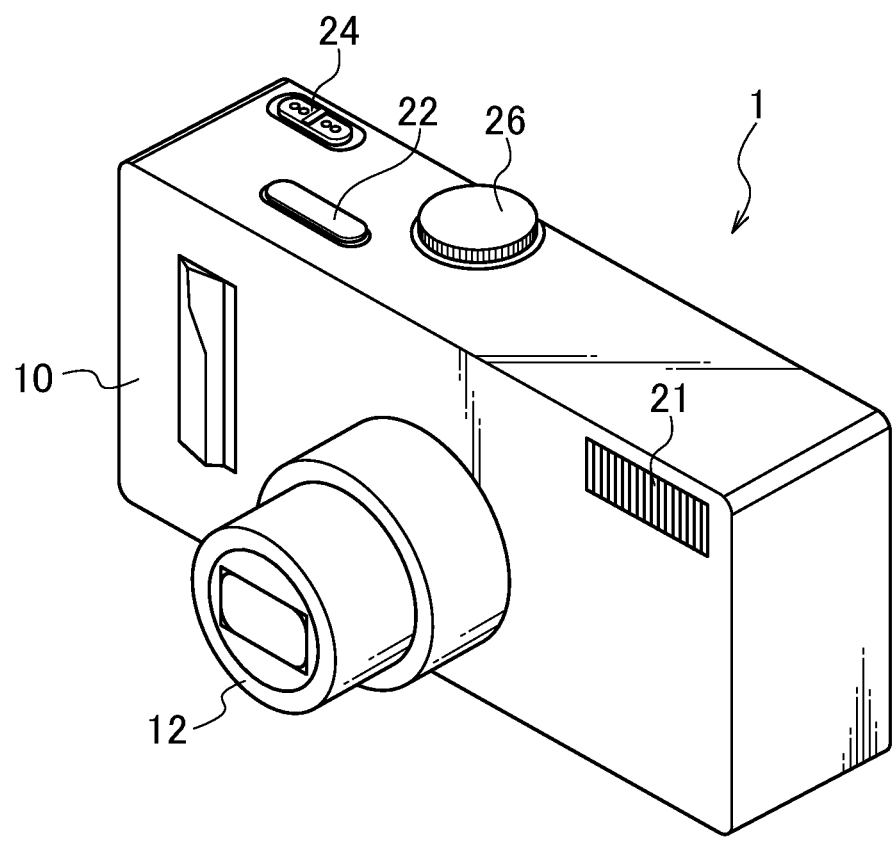
FIG. 1 is a front perspective view of a monocular stereoscopic imaging device 1 according to a first embodiment of the presently disclosed subject matter.
Figure 2:
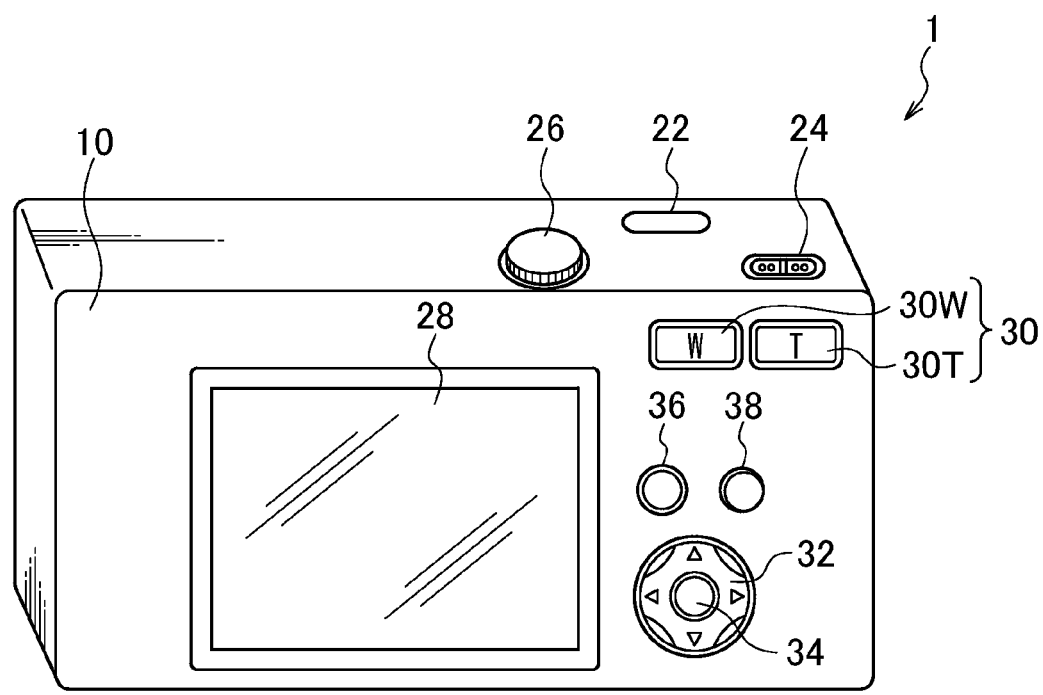
FIG. 2 is a rear perspective view of the monocular stereoscopic imaging device 1.

FIG. 1 is a front perspective view of a monocular stereoscopic imaging device 1 according to a first embodiment of the presently disclosed subject matter. FIG. 2 is a rear perspective view of the monocular stereoscopic imaging device 1. The monocular stereoscopic imaging device 1 is a digital camera for receiving light having passed through a lens on an image sensor, and converting the light into digital signals, and recording the signals on a storage media.

A camera body 10 of the monocular stereoscopic imaging device 1 is formed in a laterally long rectangular parallelepiped box shape. As illustrated in FIG. 1, a lens unit 12, a strobe 21, and other components are disposed on the front face of the camera body 10. A shutter button 22, a power/mode switch 24, a mode dial 26, and other components are disposed on the upper face of the camera body 10. In addition, as illustrated in FIG. 2, a liquid crystal monitor 28, a zoom button 30, a cross button 32, a MENU/OK button 34, a reproducing button 36, a BACK button 38, and other components are disposed on the rear face of the camera body 10.

A tripod hole as well as a battery slot and a memory card slot with a cover that can be opened and closed are disposed on the bottom face (not illustrated) of the camera body 10, and a battery and a memory card are respectively inserted into the battery slot and the memory card slot.

The lens unit 12 includes a retractable zoom lens, which comes out from the camera body 10 by setting the mode of the camera to a photographing mode using the power/mode switch 24. The zoom mechanism and the retracting mechanism of the lens unit 12 are well-known techniques; thus descriptions of their detailed configurations will be omitted.

The strobe 21 irradiates a strobe light toward a major object.

The shutter button 22 is a two-stroke switch including a so-called "half press" and "full press." While the monocular stereoscopic imaging device 1 is operating in the photographing mode, an AE/AF is activated by "half-pressing" the shutter button 22, and photographing is executed by "fully pressing" the shutter button 22. While the monocular stereoscopic imaging device 1 is operating in a projecting mode, projecting is executed by "fully pressing" the shutter button 22.

The power/mode switch 24 is an operating member having a function as a power switch for powering on and off the monocular stereoscopic imaging device 1, as well as a function as a mode switch for setting the mode of the monocular stereoscopic imaging device 1. The power/mode switch 24 is disposed so as to be slidable from an "OFF position," a "reproducing position" to a "photographing position," and vice versa. The monocular stereoscopic imaging device 1 is powered on by sliding the power/mode switch 24 to the "reproducing position" or to the "photographing position," and powered off by sliding power/mode switch 24 to the "OFF position." The power/mode switch 24 is slid to the "reproducing position" so as to be set in the "reproducing mode," and to the "photographing position" to be set in the "photographing mode."

The mode dial 26 functions as an operating member dedicated to the photographing mode setting for setting the photographing mode of the monocular stereoscopic imaging device 1. In accordance with the setting position of the mode dial 26, the photographing mode of the monocular stereoscopic imaging device 1 is set to various modes. The photographing mode of the monocular stereoscopic imaging device 1 includes a "plane image photographing mode" for photographing a plane image, a "stereoscopic vision image photographing mode" for photographing a stereoscopic vision image (3D image), a "moving image photographing mode" for photographing a moving image, and a "3D panorama photographing mode" for photographing a three-dimensional panorama, etc.

The liquid crystal monitor 28 is a three-dimensional display device capable of displaying a stereoscopic vision image (left-eye image and right-eye image) as directional images having respective predetermined directivity using a parallax barrier. When the stereoscopic vision image is input into the liquid crystal monitor 28, the parallax barrier constituted of patterns of light transparent sections and light shielding sections arranged alternately with a predetermined interval is generated on a parallax barrier display layer of the liquid crystal monitor 28, and strip image pieces for illustrating the right and left images are alternately arranged and displayed on an image display plane of a layer under this parallax barrier layer. When the liquid crystal monitor 28 is used for a plane image or as a user interface display panel, nothing is displayed on the parallax barrier display layer, and an image is displayed as it is on the image display plane of the layer under the parallax barrier display layer. The configuration of the monitor 28 is not limited to this, and any display devices that allow the user to view the left-eye mage and the right-eye image separately by using a lenticular lens, or special glasses such as polarization glasses and liquid crystal shutter glasses may be applicable, as long as those display devices recognizably display a stereoscopic vision image as a three-dimensional image. An organic EL (electroluminescence) display or the like may be used instead of the liquid crystal monitor.

The zoom button 30 functions as an operating member dedicated to a zoom instruction for instructing the zoom operation. The zoom button 30 includes a zoom telephoto button 30T for instructing a zoom toward a telephoto side, and a zoom wide button 30W for instructing a zoom toward a wide side. In the monocular stereoscopic imaging device 1, the focus distance of the lens unit 12 is changed by operating the zoom telephoto button 30T and the zoom wide button 30W in the photographing mode. An image under reproduction is scaled up or down by operating the zoom telephoto button 30T and the zoom wide button 30W in the reproducing mode.

The cross button 32 is an operating member for inputting an instruction of the four directions that are upward, downward, leftward and rightward directions, and functions as a button for selecting an appropriate item from a menu display screen, or instructing a selection of various setting items from each menu (operating member for cursor operation and movement). The right and left keys function as frame advance (forward direction/backward direction frame advance) buttons in the reproducing mode.

The MENU/OK button 34 is an operating key functioning as a menu button for instructing a display of the menu on the display screen of the liquid crystal monitor 28, as well as functioning as an OK button for instructing a decision and an execution of the selected operation.

The reproducing button 36 is a button for changing over to the reproducing mode so as to display on the liquid crystal monitor 28 still images or moving images of stereoscopic vision images (3D images) or plane images (2D images) that have been photographed and recorded.

The BACK button 38 functions as a button for instructing a cancel of an input operation or return to a previous operational state.

[Configuration Example of Imaging Optical System and Image Sensor]

The lens unit 12 includes a taking lens 14, a diaphragm 16, a solid-state image sensor (referred to as a phase-difference CCD (charge-coupled device), hereinafter) 17 that is a phase-difference image sensor.

The taking lens 14 is an imaging optical system constituted of multiple lenses including a zoom lens for changing the focus distance of the taking lens 14, and a focus lens for adjusting the focus of the taking lens 14. The zoom lens and the focus lens are continuously movable in their optical axes.

The diaphragm 16 includes an iris diaphragm, for example. The diaphragm 16 is configured to have an aperture whose maximum value is F2.8 and whose minimum value is F11, as one example, so that the degree of aperture is continuously or gradually changeable between the maximum value and the minimum value.

Figure 3A:
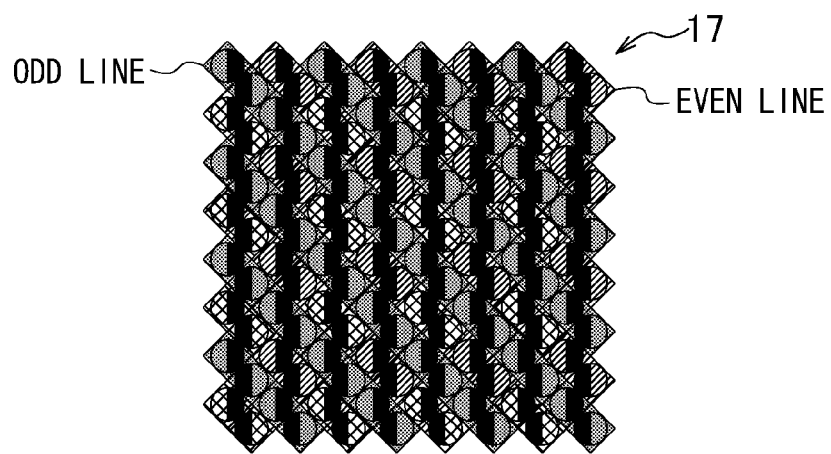
FIG. 3A is a drawing illustrating an example of a configuration of a phase-difference CCD of the monocular stereoscopic imaging device 1.
Figure 3B:
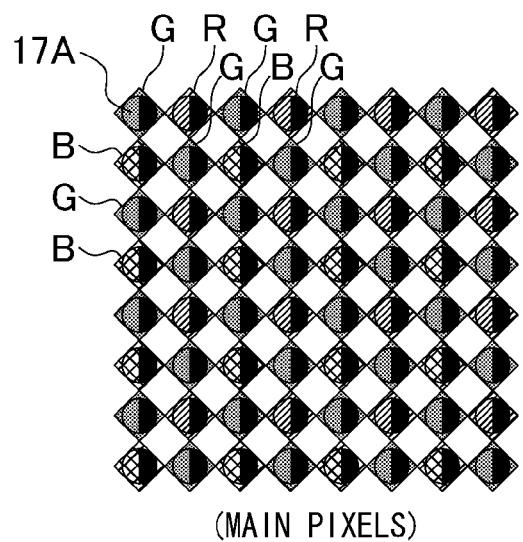
FIG. 3B is a drawing illustrating an example of the configuration of the phase-difference CCD of the monocular stereoscopic imaging device 1 (main pixel)
Figure 3C:
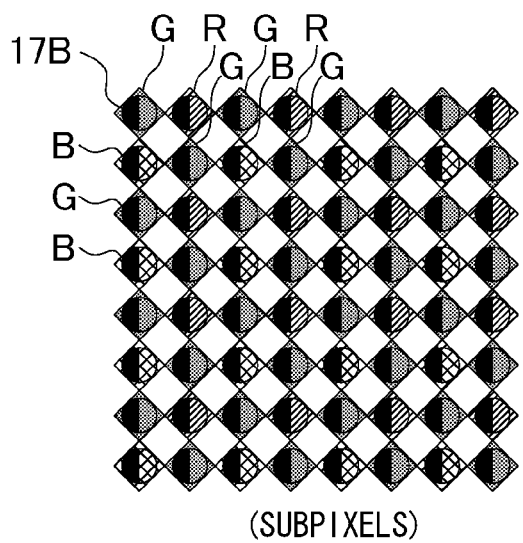
FIG. 3C is a drawing illustrating an example of the configuration of the phase-difference CCD of the monocular stereoscopic imaging device 1 (subpixel)

FIG. 3A to FIG. 3C are drawings illustrating an example of the configuration of the phase-difference CCD 17.

The phase-difference CCD 17 has pixels of odd lines (main pixels) and pixels of even lines (subpixels) that are each arranged in a matrix, and image signals for double planes each photoelectrically converted by the main pixels and the subpixels can be read out separately.

As illustrated in FIG. 3B, among pixels having color filters of R (red), G (green), and B (blue), the odd lines (1, 3, 5, . . . ) of the phase-difference CCD 17 are provided with lines of a pixel array of GRGR . . . and lines of a pixel array of BGBG . . . alternately arranged. On the other hand, as illustrated in FIG. 3C, as similar to the odd lines, pixels on the even lines (2, 4, 6, . . . ) are provided with lines of a pixel array of GRGR . . . and lines of a pixel arrays of BGBG . . . alternately arranged, and each pixel is shifted by ½ pitch in the line direction relative to the pixels on the even lines.

Figure 4:
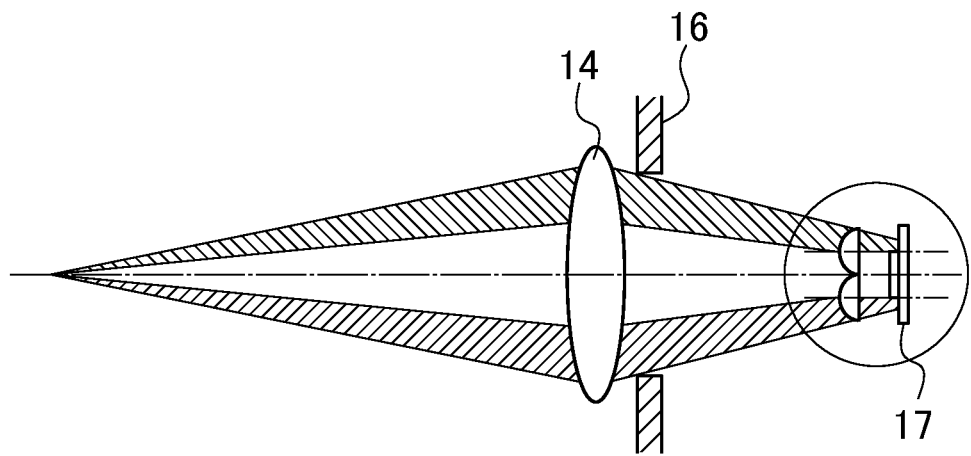
FIG. 4 is a drawing illustrating each pixel of the main pixels and subpixels of the phase-difference CCD, a taking lens, and a diaphragm.

FIG. 4 is a drawing illustrating the taking lens 14 and each pixel of the main pixels and the subpixels of the phase-difference CCD 17, and FIG. 5A to FIG. 5C are enlarged views of the main part of FIG. 4.

A light shielding member 17A is disposed on a front side (a microlens L side) of the main pixel of the phase-difference CCD 17, and the light shielding member 17B is disposed on a front side of the subpixel thereof. Each of the light shielding members 17A and 17B has a function as a pupil dividing member. As illustrated in FIG. 5A, a light flux passing through an exit pupil enters a pixel of a normal CCD (photodiode PD) through the microlens L without any limitation. As illustrated in FIG. 5B, the light shielding member 17A shields the right half of a light receiving surface of the main pixel (photodiode PD). Hence, the main pixel receives light only on the left side relative to the optical axis of the light flux passing through the exit pupil. As illustrated in FIG. 5C, the light shielding member 17B shields the left half of the light receiving surface of the subpixel (photodiode PD). Hence, the subpixel receives light only on the right side relative to the optical axis of the light flux passing through the exit pupil.

Hereinafter, description will be provided on a mechanism of photographing a stereoscopic vision image on the phase-difference CCD 17 in which each main pixel of the phase-difference CCD 17 receives light only on the left side relative to the optical axis of the light flux passing through the exit pupil, and each subpixel receives light only on the right side relative to the optical axis of the light flux passing through the exit pupil in the above manner.

Figure 6B:
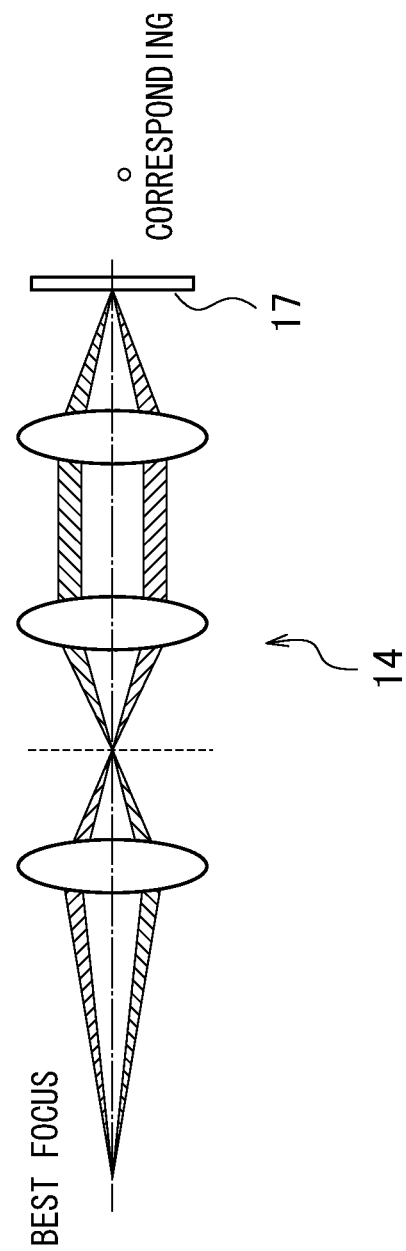
FIG. 6B is a drawing illustrating a separated state of an image imaged on the image sensor with the focus point corresponding to the subject (best focus)

FIG. 6A to FIG. 6C are drawings illustrating separated states of an image imaged on the image sensor is separated depending on the difference in the focus point of the focus lens, i.e., a focus point in front of the subject, a focus point corresponding to the subject (best focus), and a focus point in back of the subject. The diaphragm 16 is omitted in the FIG. 6A to FIG. 6C for the sake of comparing the difference in the image separation resulting from the focus point.

As illustrated in FIG. 6B, the pupil-divided images in focus are imaged at the identical position (corresponds to each other) on the image sensor. On the other hand, as illustrated in FIG. 6A and FIG. 6C, the pupil-divided images focused in front or in back of the subject are imaged at different positions (separated from each other) on the image sensor 17.

Accordingly, the object images pupil-divided in the left and right directions are acquired through the phase-difference CCD 17, thereby acquiring the left-eye image and the right-eye image (stereoscopic vision image) having different parallaxes depending on the focus position.

In the phase-difference CCD 17 having the above-mentioned configuration, the main pixel and the subpixel are respectively configured to limit the light fluxes by the light shielding members 17A, 17B on different areas (on the right half, on the left half) from each other, but the presently disclosed subject matter is not limited to this. Without providing the light shielding members 17A, 17B, the microlens L may be shifted relative to the photodiode PD in the right and left directions, and the light flux entering the photodiode PD may be limited depending on this shifting direction, for example. A single microlens may be provided for two pixels (main pixel and subpixel), thereby limiting the light flux entering each pixel.

[Internal Configuration of Imaging Device]

Figure 7:
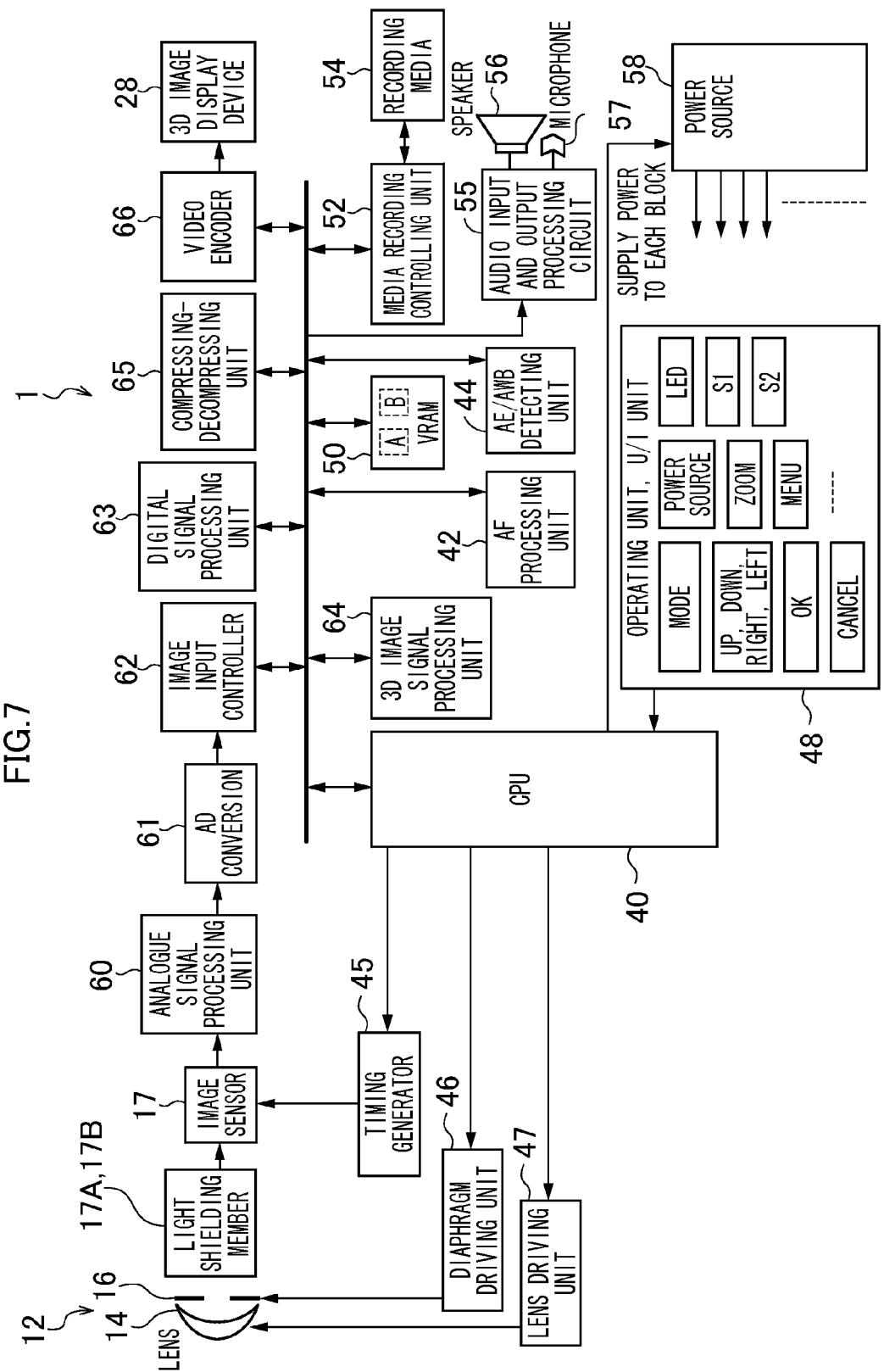
FIG. 7 is a block diagram of an internal configuration of the monocular stereoscopic imaging device 1.

FIG. 7 is a block diagram of the monocular stereoscopic imaging device 1 according to the first embodiment of the presently disclosed subject matter. The monocular stereoscopic imaging device 1 records an acquired image on a recording media 54, and the overall operation thereof is comprehensively controlled by a central processing device (CPU; central processing unit) 40.

The monocular stereoscopic imaging device 1 has an operating unit 48 including the shutter button, the mode dial, the reproducing button, a MENU/OK button, a cross button, a BACK button, and other components. Signals from the operating unit 48 are input into the CPU 40. The CPU 40 controls each circuit of the monocular stereoscopic imaging device 1 based on the input signals from the operating unit 48, so as to execute a lens driving control, a diaphragm driving control, a photographing operation control, an image processing control, an image data recording/reproducing control, a display control of the liquid crystal monitor 28 for the three-dimensional display.

When the stereoscopic imaging device 1 is powered on by using the power/mode switch 24, the power is fed to each block from a power source 58, and then the stereoscopic imaging device 1 is activated.

The light flux having passed through the taking lens 14, the diaphragm 16, and others is imaged on the phase-difference CCD 17, and signal charges are accumulated in the phase-difference CCD 17. The signal charges accumulated in the phase-difference CCD 17 are read out as voltage signals corresponding to the signal charges in accordance with reading signals provided from a timing generator 45. The voltage signals read out from the phase-difference CCD 17 are input into an analogue signal processing unit 60.

The analogue signal processing unit 60 carries out correlative double sampling processing on the voltage signals output from the phase-difference CCD 17 (processing to obtain accurate pixel data by finding a difference between a field through component level and a pixel signal component level contained in an output signal for each pixel of the image sensor, so as to reduce noises (particularly, thermal noises) contained in the output signals of the image sensor), thereby sampling-holding the R, G, B signals for each pixel. These voltage signals are amplified, and then input into an AD converter 61. The AD converter 61 converts the R, G, B signals that are sequentially input into digital R, G, B signals, and then outputs the signals to an image input controller 62.

A digital signal processing unit 63 executes predetermined signal processing such as offset processing, gain control processing including a white balance correction and a sensitivity correction, gamma correction processing, and YC processing on the digital image signals input through the image input controller 62. Main pixel data read out from the main pixels on the odd lines of the phase-difference CCD 17 are processed as left-eye image data, and subpixel data read out from the subpixels on the even lines are processed as right-eye image data.

The left-eye image data and the right-eye image data (3D image data) processed on the digital signal processing unit 63 are input into a VRAM (Video Random Access Memory) 50. The VRAM 50 includes an area A and an area B each for storing the 3D image data representing the 3D image of one frame. The 3D image data representing the 3D image of one frame is alternately overwritten in the area A and in the area B of the VRAM 50. Of the area A and the area B of the VRAM 50, the 3D image data being written is read out from the area other than the area in which the 3D image data is being overwritten.

The 3D image data read out from the VRAM 50 is processed on a 3D image signal processing unit 64 into strip image pieces. The 3D image data processed into strip image pieces is encoded on a video encoder 66, and output to the liquid crystal monitor (3D image display device) 28 for the three-dimensional display that is disposed on the rear face of the camera. Accordingly, the 3D object image is continuously displayed on the display screen of the liquid crystal monitor 28.

The photographer monitors the images (through images) displayed on the liquid crystal monitor 28 in real time so as to confirm the angle of view of the photographing. In response to the operations of the zoom telephoto button 30T and the zoom wide button 30W, the CPU 40 moves the zoom lens along the optical axis through the lens driving unit 27, so as to change the focus distance.

Figure 8:
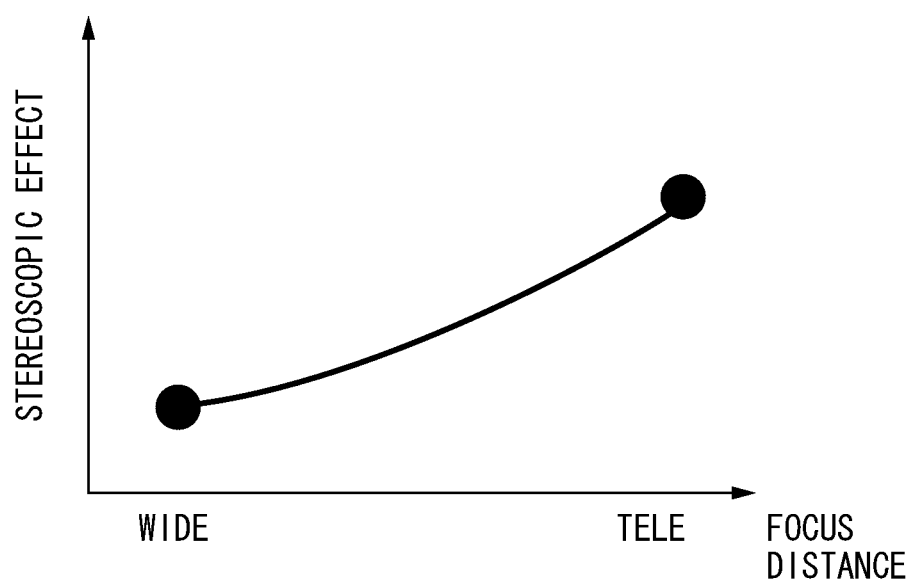
FIG. 8 is a drawing illustrating a relation between a focus distance and a stereoscopic effect.

FIG. 8 is a graph illustrating a relation between the focus distance and the stereoscopic effect. The 3D object image is displayed on the liquid crystal monitor 28 such that the object located at the focus position is displayed as if it is located on the screen plane where the parallax is 0; the object located backward from the focus position (farther from the phase-difference CCD17) is displayed as if it retreats from the display plane; and the object located frontward from the focus position (closer to the phase-difference CCD17) is displayed as if it pops out from the display plane. A sum of the parallax in the direction of retracting from the display plane (parallax in the divergence direction) and the parallax in the direction of popping out from the display plane (excessive parallax) is defined as the stereoscopic effect.

As illustrated in FIG. 8, the stereoscopic effect varies depending on the focus distance. The stereoscopic effect is increased as the focus distance is greater, that is, as the zoom position is shifted to the telephoto side. On the other hand, the stereoscopic effect is decreased as the focus distance is smaller, that is, as the zoom position is shifted to the wide-angle side. When the zoom button 30 is operated while displaying through images or moving images on the liquid crystal monitor 28, the stereoscopic effect varies depending on the focus distance, which causes an uncomfortable feeling to the photographer.

Figure 9A:
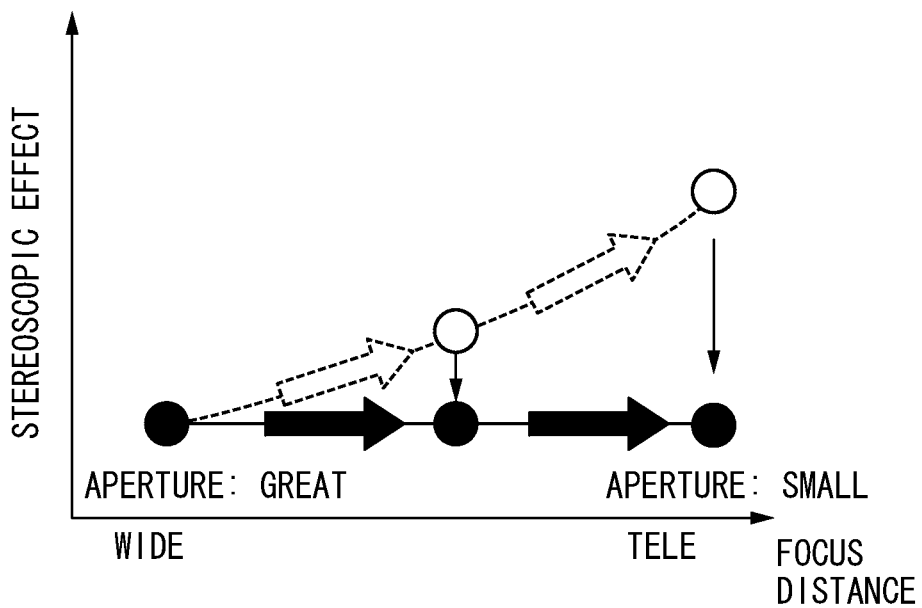
FIG. 9A is a drawing illustrating the relation between the focus distance and the stereoscopic effect when zooming is carried out from a wide-angle end toward a telephoto end.
Figure 9B:
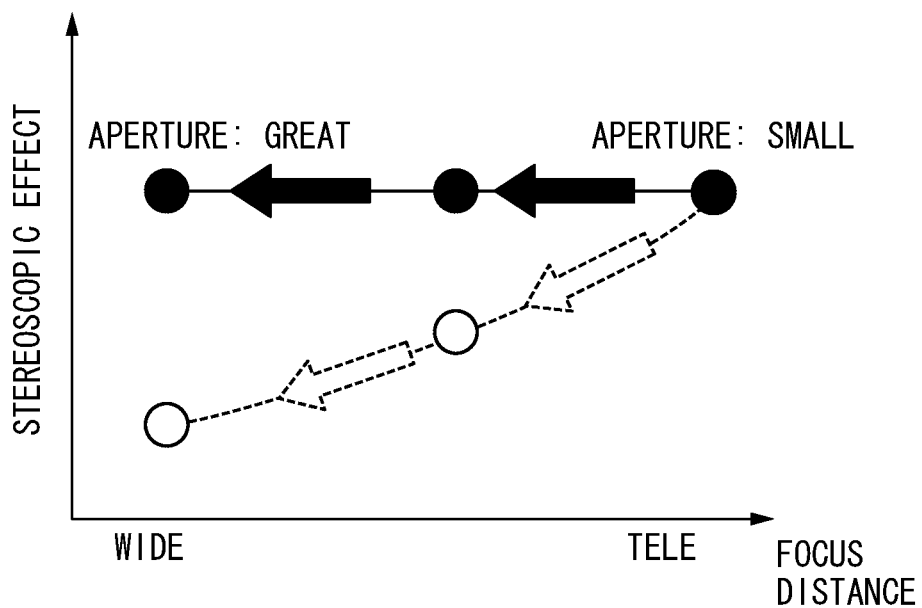
FIG. 9B is a drawing illustrating the relation between the focus distance and the stereoscopic effect when zooming is carried out from the telephoto end toward the wide-angle end.
Figure 10A:
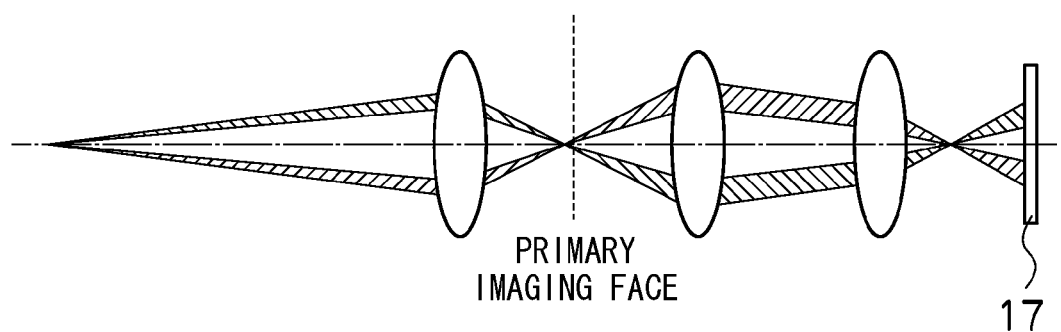
FIG. 10A is a drawing explaining a relation between the degree of aperture of a diaphragm 16 and a parallax for an image with the focus position located in back of the object in the case of using a smaller degree of aperture.
Figure 10B:
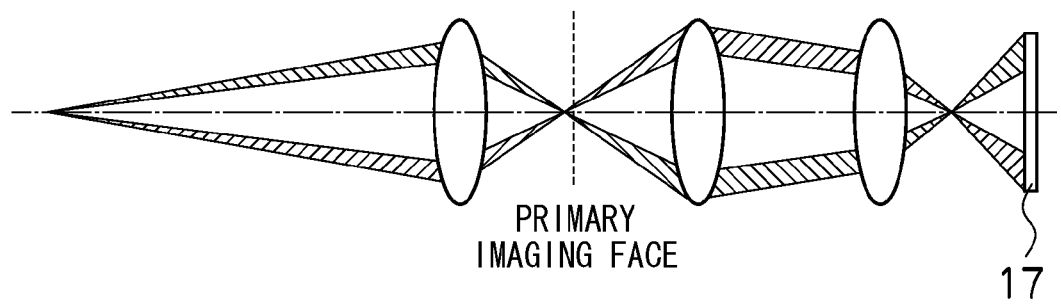
FIG. 10B is a drawing explaining the relation between the degree of aperture of the diaphragm 16 and the parallax for an image with the focus position located in back of the object in the case of using a greater degree of the aperture.

Therefore, as illustrated in FIG. 9A and FIG. 9B, the CPU 40 controls the degree of aperture of the diaphragm 16 in accordance with the variation of the focus distance, thereby stabilizing the stereoscopic effect at a constant level around the focus distance. FIG. 10A and FIG. 10B are drawings explaining a relation between the degree of aperture of the diaphragm 16 and the parallax with the focus position located in back of the object. The degree of aperture is small in FIG. 10A, and the degree of aperture is large in FIG. 10B. As explained in FIG. 6C, the images with the focus position located in back of the object are imaged at different positions (separated) on the image sensor, and a smaller degree of aperture illustrated in FIG. 10A decreases the separation of the images, and a greater degree of aperture illustrated in FIG. 10B increases the separation of the images. This means that the parallax becomes smaller when the degree of aperture of the diaphragm 16 is smaller, and the parallax becomes greater when the degree of aperture of the diaphragm 16 is greater.

That is, as illustrated in FIG. 9A, since the stereoscopic effect becomes greater when the zoom lens is moved from the wide-angle end toward the telephoto end (in the direction of increasing the focus distance), the CPU 40 decreases the degree of aperture of the diaphragm 16 so as to decrease the stereoscopic effect. Accordingly, the stereoscopic effect can be constantly maintained as the stereoscopic effect is located at the wide-angle end. As illustrated in FIG. 9B, the stereoscopic effect becomes smaller when the zoom lens is moved from the telephoto end toward the wide-angle end (in the direction of decreasing the focus distance), therefore, the CPU 40 increases the degree of aperture of the diaphragm 16 so as to increase the stereoscopic effect. Accordingly, the stereoscopic effect can be constantly maintained as the stereoscopic effect is located at the telephoto end.

The relation between the degree of aperture of the diaphragm 16 and the focus distance is stored on a storage area of the CPU 40. More than one relation is stored there in accordance with the brightness of the object. The CPU 40 acquires the size of the aperture of the diaphragm 16 from the 3D image data, and determines which relation should be used. The CPU 40 varies the degree of the aperture of the diaphragm 16 through the diaphragm driving unit 46 based on the driving amount of the zoom lens, that is, the amount of change in the focus distance, and the relation between the determined degree of the aperture and the focus distance, so as to maintain the stereoscopic effect of the three-dimensional image displayed on the liquid crystal monitor 28 at a constant level.

It may be impossible to adjust the stereoscopic effect through the diaphragm 16 depending on the brightness of the object. For example, this may occur when the brightness of the object is great, and the zoom lens is not located at the wide-angle end. In this case, the CPU 40 may open the aperture of the diaphragm 16 at a level where the stereoscopic effect can be adjusted, and thereafter, may adjust the stereoscopic effect. Specifically, the CPU 40 determines to use a relation in the case where the aperture of the diaphragm 16 is greater, among the relations between the degree of the aperture and the focus distance, which are stored on the storage area of the CPU 40. The CPU 40 acquires the degree of the aperture of the diaphragm 16 corresponding to the current focus distance based on the determined relation, and increases the degree of aperture of the aperture until it becomes equal to this acquired degree of the aperture. Subsequently, the CPU 40 may drive the aperture of the diaphragm 16 in accordance with the movement of the zoom lens using the determined relation. In this case, the aperture of the diaphragm 16 becomes the greatest at the wide-angle end (F11 in the present embodiment).

There may be such a case in which the brightness of the object is dark, and the zoom lens is not located at the telephoto end. In this case, the CPU 40 may close the aperture of the diaphragm 16 at a level where the stereoscopic effect can be adjusted, and thereafter, adjust the stereoscopic effect. Specifically, the CPU 40 determines to use a relation in the case where the aperture of the diaphragm 16 is smaller, among the relations between the degree of the aperture and the focus distance, which are stored on the storage area of the CPU 40. The CPU 40 acquires the degree of the aperture of the diaphragm 16 corresponding to the current focus distance based on the determined relation, and decreases the degree of aperture of the aperture until it becomes equal to this acquired degree of the aperture. Subsequently, the CPU 40 may drive the aperture of the diaphragm 16 in accordance with the movement of the zoom lens using the determined relation. In this case, the aperture of the diaphragm 16 becomes the smallest at the telephoto end (F2.8 in the present embodiment).

With reference to FIG. 7 once again, in response to the first stage pressing (half-pressing) of the shutter button 22 of the operating unit 48, the CPU 40 starts the AF (automatic focus adjustment) operation and the AE (automatic exposure) operation, and controls the focus lens to move in the optical axis direction through the lens driving unit 47 so as to shift the focus lens at the focus position.

An AF processing unit 42 is a part for executing contrast AF processing or phase-difference AF processing. When executing the contrast AF processing, the AF processing unit 42 extracts high frequency components of the image data stored in a predetermined focus area, from at least one of the left-eye image data and the right-eye image data. The AF processing unit 42 then integrates the high frequency components so as to calculate the AF evaluation values indicating the focus states. AF control is executed by controlling the focus lens in the taking lens 14 such that the AF evaluation value becomes a maximum. When executing the phase-difference AF processing, the AF processing unit 42 detects the phase differences between the image data corresponding to the main pixels and the image data corresponding to the subpixels that are located in the predetermined focus area of the left-eye image data and the right-eye image data, and finds the degree of defocus based on the information indicating the detected phase differences. The AF control is executed by controlling the focus lens in the taking lens 14 such that the degree of defocus becomes 0.

The AF operation is executed not only when the shutter button 22 is pressed at the first stage (half-pressing), but also when the right-eye image data and left-eye image data are continuously photographed. The continuous photographing of the right-eye image data and the left-eye image data may be conducted in the case of photographing live view images (through images), or in the case of photographing moving images, etc. In this case, while continuously photographing the right-eye image data and the left-eye image data, the AF processing unit 42 performs the continuous AF to continuously control the position of the focus lens by repetitively executing the calculation of the AF evaluation values all the time.

The CPU 40 moves the zoom lens frontward and backward in the optical axis direction through the lens driving unit 47 if necessary, so as to change the focus distance.

The image data output from the AD converter 61 at the time of half-pressing the shutter button 22 is captured into an AE/AWB detecting unit 44.

The AE/AWB detecting unit 44 integrates G signals of the entire display plane, or integrates the G signals having different weights at the center portion of the display plane from the surrounding portion of the display plane, and outputs these integrated values to the CPU 40. The CPU 40 calculates a brightness of the object (photographing Ev value) based on the integrated values input from the AE/AWB detecting unit 44, and based on the photographing Ev value, the CPU 40 determines the aperture value of the diaphragm 16 and the electronic shutter (shutter speed) of the phase-difference CCD 17 in accordance with a predetermined program diagram. The CPU 40 controls the diaphragm 16 through the diaphragm driving unit 46 based on the determined aperture value, and also controls the charge accumulating time on the phase-difference CCD 17 through the timing generator 45 based on the determined shutter speed.

After the AE operation and the AF operation are completed, in response to the second stage pressing (full-pressing) of the shutter button 22, the image data for two images of the left-eye image (main image) and the right-eye image (sub-image) corresponding to the main pixels and the subpixels output from the AD converter 61 are input from the image input controller 62 into the VRAM 50, and are temporarily stored there.

The image data for two images temporarily stored on the VRAM 50 is read out by the digital signal processing unit 63 at an appropriate timing, and on this digital signal processing unit 63, a predetermined signal processing including processing to generate brightness data and color difference data for the image data (YC processing) is carried out. The image data (YC data) to which the YC processing has been carried out is stored on the VRAM 50 once again. Subsequently, the YC data for two images are output into a compressing-decompressing unit 65, where a predetermined compression processing such as JPEG (joint photographic experts group) is carried out to the YC data, and then is stored on the VRAM 50 once again.

From the YC data (compressed data) for two images stored on the VRAM 50, a multi-picture file (MP file: file in a format of combining multiple images) is generated on the 3D image signal processing unit 64. This MP file is read out by a media controller (media recording controlling unit) 52, and is recorded on the recording media 54.

The monocular stereoscopic imaging device 1 can record and reproduce not only moving images and still images but also audios. A microphone 57 receives input of external audios. A speaker 56 outputs recorded audios. When recording audios, an audio input and output processing circuit 55 encodes the audios input from the microphone 57, and when reproducing the recorded audios, the audio input and output processing circuit 55 decodes the recorded audios, and then outputs the audios to the speaker 56.

[Description of Operation of Imaging Device]

The operation of the monocular stereoscopic imaging device 1 will be now described. This imaging processing is controlled by the CPU 40. A program for allowing the CPU 40 to execute this imaging processing is stored on a program storage unit in the CPU 40.

Figure 11:
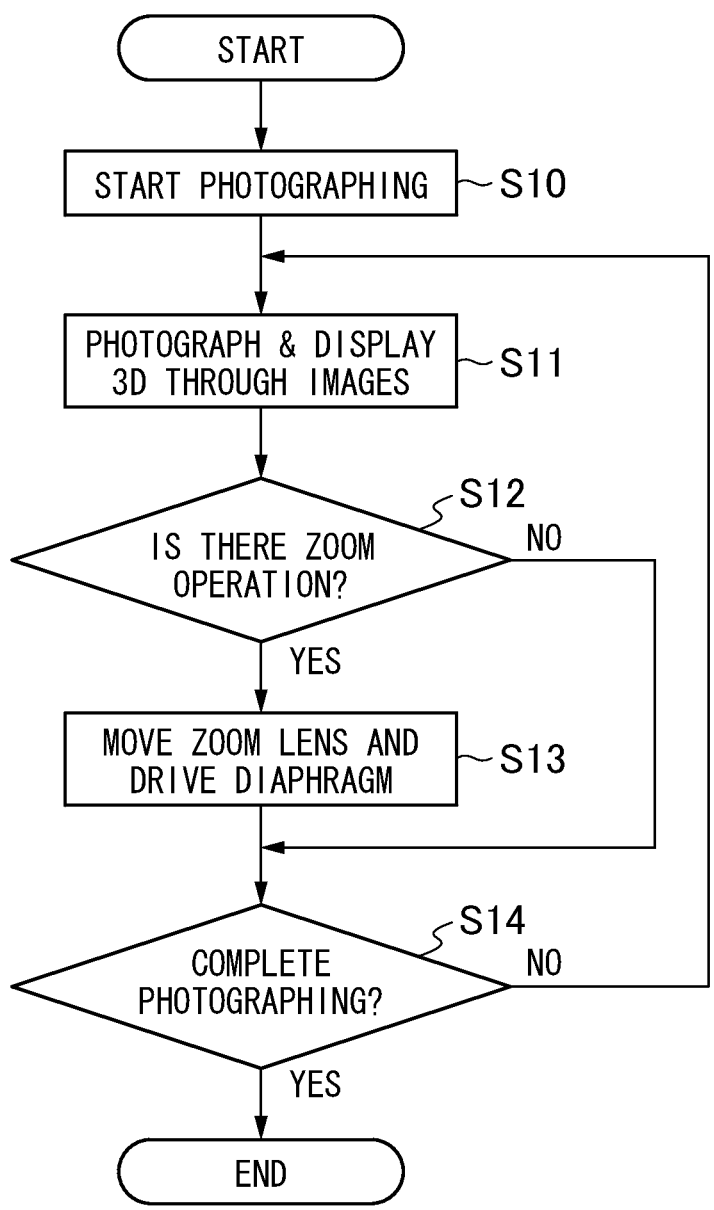
FIG. 11 is a flow chart of a photographing process of through images in the monocular stereoscopic imaging device 1.

FIG. 11 is a flow chart illustrating a flow of the photographing and displaying operation of the live view images.

In response to an input of an instruction for staring photographing (step S10), the CPU 40 drives the taking lens 14 and the diaphragm 16 to move to an initial position, so that light of the object having passed through the taking lens 14 is imaged through the diaphragm 16 on the light receiving surface of the phase-difference CCD 17. The signal charges accumulated on the main pixels and the subpixels of the phase-difference CCD 17 are read out by turns, as the voltage signals (image signals) corresponding to the signal charges, at a predetermined frame rate in accordance with the timing signals output from the timing generator 45. The voltage signals read out are input into the digital signal processing unit 63 by turns through the analogue signal processing unit 60, the AD converter 61, and the image input controller 62, so as to generate the left-eye image data and the right-eye image data. The generated left-eye image data and the right-eye image are input into the VRAM 50 by turns. The left-eye image data and the right-eye image are read out from the VRAM 50 by turns, and the 3D image signal processing unit 64 generates brightness/color difference signals for the left-eye image data and the right-eye image that have been read out, and the generated brightness/color difference signals are output to the liquid crystal monitor 28 through the video encoder 66. The parallax barrier is displayed on the liquid crystal monitor 28, and the strip image pieces of the left-eye image data and the right-eye image data are alternately arranged and displayed on the image display plane of the layer under this parallax barrier layer (step S11). Accordingly, the 3D through images are displayed on the liquid crystal monitor 28.

The CPU 40 determines whether or not the zoom operation has been carried out, that is, the instruction for the zoom operation has been input through the operating unit 48 (step S12).

When the zoom operation has been carried out (YES in step S12), the CPU 40 moves the zoom lens through the lens driving unit 47 in accordance with the input from the operating unit 48, so as to change the focus distance of the taking lens 14. The CPU 40 finds the brightness of the object based on the left-eye image data and the right-eye image data, and the CPU 40 selects a relation corresponding to the desired brightness of the object among the relations between the focus distance and the degree of the aperture, which are stored on the storage area of the CPU 40. The CPU 40 drives the diaphragm 16 through the diaphragm driving unit 46, and changes the degree of the aperture based on the selected relation, such that the stereoscopic effect before the zoom operation is carried out (step S12) is maintained (step S13).

When the zoom operation has been executed, the CPU 40 moves the focus lens through the lens driving unit 47 so that the focus position is prevented from being varied along with the movement of the zoom lens. Accordingly, no variation of the parallax occurs even if the focus position is changed.

After the degree of the aperture of the diaphragm 16 is varied in accordance with the zoom operation (step S13), or when the zoom operation has not been carried out (NO in step S12), the CPU 40 determines whether or not an instruction for completing the photographing has been input (step S14).

When no instruction for completing the photographing has been input (NO in step S14), the processes of step S11 to step S14 are carried out once again.

When the instruction for completing the photographing (such as the half-pressing of the shutter button, the operation to complete the photographing mode, the operation to power off the power source, etc.) has been input (YES in step S14), the photographing process of the through images is completed.

When the shutter button is half-pressed, an S1ON signal is input into the CPU 40, and the CPU 40 executes the AE/AF operation through the AF processing unit 42 and the AE/AWB detecting unit 44. In the photographing process of a stereoscopic vision image, the AF processing unit 42 executes the AF operation through the phase-difference AF processing.

When the shutter button is full-pressed, an S2ON signal is input into the CPU 40, and the CPU 40 starts the photographing and recording processing. Specifically, the phase-difference CCD 17 is exposed using the shutter speed and the aperture value determined based on a photometry result.

The image data for two images output from the main pixels and the subpixels of the phase-difference CCD 17 are captured through the analogue signal processing unit 60, the AD converter 61, and the image input controller 62 into the VRAM 50, and are converted into the brightness/color difference signals on the 3D image signal processing unit 64, and then are stored on the VRAM 50. The left-eye image data stored on the VRAM 50 is added into the compressing-decompressing unit 65 so as to be compressed in a predetermined compressed format (JPEG format, for example), and thereafter the compressed data is stored on the VRAM 50.

An MP file is generated from the compressed data for two images that is stored on the VRAM 50, and this MP file is recorded on the recording media 54 through the media controller 52. In such a manner, the stereoscopic vision image is photographed and recorded.

The present embodiment has been described by using the example of photographing the stereoscopic vision image, but the monocular stereoscopic imaging device 1 can photograph both a plane image and a stereoscopic vision image. When photographing of the plane image, only the main pixels of the phase-difference CCD 17 may be used for photographing. The details of the photographing process for the plane image are the same as those for the stereoscopic vision image; thus description thereof will be omitted.

The images recorded on the recording media 54 in this manner can be displayed on the liquid crystal monitor 28 by setting the mode of the monocular stereoscopic imaging device 1 to the reproducing mode through the reproducing button.

When the mode is set to the reproducing mode, the CPU 40 outputs a command to the media controller 52 to read out an image file latest recorded on the recording media 54.

The compressed image data of the image file read out is added into the compressing-decompressing unit 65, so as to be decompressed into the uncompressed brightness/color difference signals, and thereafter the signals are output to the liquid crystal monitor 28 through the video encoder 66.

The frame advance of the images is executed by operating the right and left keys of the cross key. Pressing the right key of the cross key enables reading out of a next image file from the recording media 54, and displaying of this image on the liquid crystal monitor 28; and pressing the left key of the cross key enables reading out of a previous file from the recording media 54, and displaying of this image on the liquid crystal monitor 28.

According to the present embodiment, even if the zoom lens is moved during the display of the live view images, the stereoscopic effect of the three-dimensional images displayed on the liquid crystal monitor 28 can be maintained at a constant level all the time, resulting in reduction of the uncomfortable feeling of the photographer.

The present embodiment has been described by using the example of the photographing and displaying of the live view images, but this embodiment may be applicable to the case of continuously acquiring the right-eye image data and the left-eye image data, such as the case of photographing moving images. The photographing of the live view images and the photographing of the moving images are different only in that the right-eye image data and the left-eye image data that have continuously been photographed are not recorded in the case of the live view image photographing, whereas the right-eye image data and the left-eye image data that have continuously been photographed are recorded on the recording media 54 in addition to the process of FIG. 11 in the case of the moving image photographing. The processing of recording the right-eye image data and the left-eye image data that have continuously been photographed on the recording media 54 is a well-known technique; thus the detailed description thereof will be omitted.

In the present embodiment, a graph of the relation between the amount of change in degree of the aperture of the diaphragm 16 and the amount of change in focus distance is stored on the storage area of the CPU 40, and the CPU 40 changes the degree of the aperture of the diaphragm 16 based on this stored relation and the amount of the zoom lens driving, but the method of changing the degree of the aperture of the diaphragm 16 is not limited to this. For example, a maximum value of the parallax in the divergence direction and a maximum value of the excessive parallax may be obtained from the right-eye image data and the left-eye image data before the zoom lens is moved, and the maximum value of the parallax in the divergence direction and the maximum value of the excessive parallax may be obtained in real time from the right-eye image data and the left-eye image data that are varied along with the movement of the zoom lens, and the aperture of the diaphragm 16 may be varied such that the maximum value of the parallax in the divergence direction and the maximum value of the excessive parallax can be constantly maintained. In this case, no information is needed to be stored on the storage area of the CPU 40. The relation between the amount of change in degree of the aperture of the diaphragm 16 and the amount of change in focus distance that are stored on the storage area of the CPU 40 is not limited to a graph form illustrated in FIG. 9 and others. For example, a corresponding map among the position of the zoom lens, the degree of aperture of the aperture of the diaphragm 16, and the maximum values of the parallax in the divergence direction and the excessive parallax, or the like may also be applicable.

In the present embodiment, the diaphragm 16 is driven in accordance with the movement of the zoom lens such that the stereoscopic effect that is the sum of the parallax in the divergence direction and the excessive parallax can be constant, and the excessive parallax greatly affects the visibility of the stereoscopic effect. Hence, the diaphragm 16 may be driven in accordance with the movement of the zoom lens such that the maximum value of the excessive parallax becomes substantially constant, thereby maintaining the stereoscopic effect at a substantially constant level.

The parallax of a major object (such as a human face and an object at the center of the display plane) also affects the visibility of the stereoscopic effect. For this reason, the diaphragm 16 may be driven in accordance with the movement of the zoom lens such that the parallax of the major object becomes substantially constant, thereby maintaining the stereoscopic effect at a substantially constant level.

In the present embodiment, the diaphragm 16 has been configured such that the aperture value can be continuously varied in a range from F2.8 to F11, but another diaphragm having an aperture incapable of continuously changing such as a diaphragm except an iris diaphragm may also be used. For example, such a case may be applicable that employs an aperture variable in steps and a zoom lens variable seamlessly (continuously). This case indicates that the zoom lens has more driving steps than the driving steps of the diaphragm.

Figure 12:
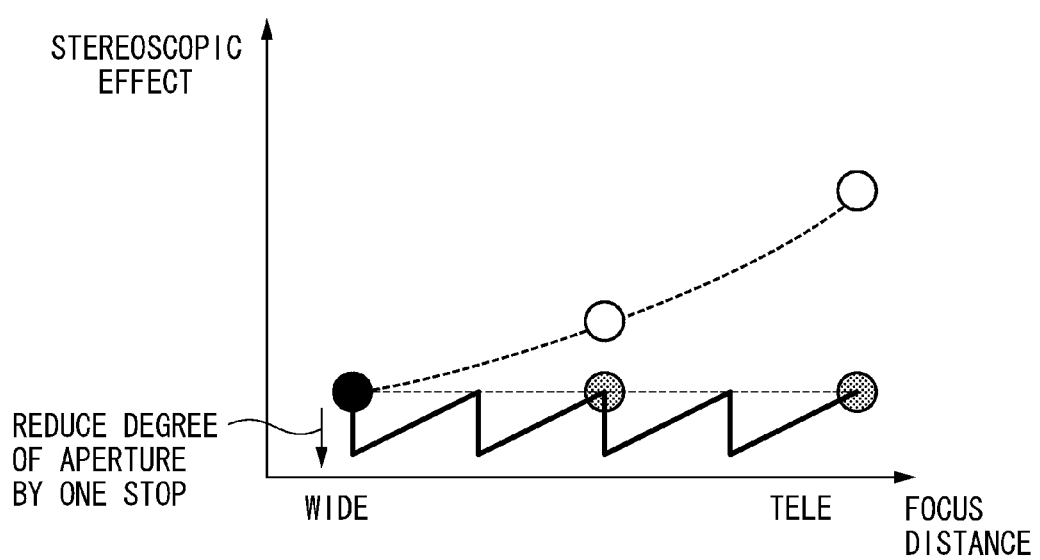
FIG. 12 is a drawing illustrating the relation between the focus distance and the stereoscopic effect, which is used for maintaining the stereoscopic effect at a constant level when the diaphragm has the number of driving steps smaller than the number of driving steps of the zoom lens.

FIG. 12 is a graph illustrating a relation between the focus distance and the stereoscopic effect in the case where a diaphragm 16' having an aperture value in a range from F2.8 to F11 and variable in ⅓ EV steps (as an example), in which the stereoscopic effect is varied in five steps, is used. FIG. 12 illustrates the variation of the stereoscopic effect when the zoom lens is moved from the wide-angle end toward the telephoto end (in the direction of increasing the focus distance). In this case, the aperture of the diaphragm cannot be varied continuously, which is different from the case of FIG. 9.

Therefore, the CPU 40 reduces the aperture of the diaphragm 16' by one stop in a state where the zoom lens is located at the wide-angle end (i.e., the degree of the aperture is reduced by one stop), so as to slightly decrease the stereoscopic effect. The CPU 40 also reduces the aperture of the diaphragm 16' by one stop before the zoom lens is moved in a case where the zoom lens is not located at the wide-angle end.

Thereafter, as the zoom lens is moved in the telephoto direction (in the direction of increasing the focus distance), the stereoscopic effect is gradually increased along with the movement of the zoom lens. When the stereoscopic effect becomes equal to the stereoscopic effect in the case where the zoom lens is located at the wide-angle end, the CPU 40 reduces the aperture of the diaphragm 16' by another one stop. Accordingly, the stereoscopic effect slightly becomes decreased. This operation is repetitively executed, thereby changing the stereoscopic effect in steps, and maintaining the stereoscopic effect at a substantially constant level.

The focus distance when the aperture of the diaphragm 16' is reduced by one stop may be stored on the storage area of the CPU 40, and the CPU 40 may change the degree of the aperture of the diaphragm based on this focus distance. The CPU 40 may acquire the stereoscopic effect from the left-eye image data and the right-eye image data in real time, and may change the degree of the aperture of the diaphragm 16' when the stereoscopic effect becomes equal to that before the zoom lens is moved.

In this configuration, it is possible to maintain the stereoscopic effect at a substantially constant level (including slight variations). Even if slightly varied, the stereoscopic effect is never varied greater than the stereoscopic effect before the zoom lens is moved. Accordingly, an uncomfortable feeling perceived by the photographer can be as small as possible.

When the zoom lens has been moved from the telephoto end to the wide-angle end (in the direction of reducing the focus distance), it may be configured such that the zoom lens is moved alone without driving the diaphragm 16', and when the stereoscopic effect is slightly decreased, the aperture of the diaphragm 16' is increased by one stop (i.e., the degree of the aperture is increased by one stop), thereby the stereoscopic effect corresponds to the stereoscopic effect before the zoom lens is moved.

The "slight amount" which is varied in the case where the stereoscopic effect is maintained at a substantially constant level is resulted from the number of the driving steps of the diaphragm used in the adjustment of the stereoscopic effect. This means that determining the number of the driving steps of the diaphragm leads to determining the slight amount varied, and determining the slight amount varied leads to determining the number of the driving steps of the diaphragm. For this reason, the number of the driving steps of the diaphragm or the slight amount varied should be set on the storage area of the CPU 40, in advance.

In the case of using a diaphragm 16' whose aperture cannot be varied continuously, the driving of the zoom lens may be limited such that the zoom lens has the number of the driving steps equal to the number of the driving steps of the diaphragm 16'. In this case, the driving of the zoom lens should be synchronized with the driving of the diaphragm 16'. The zooming thus becomes discontinuously, but the slight variation of the stereoscopic effect can be prevented.

In the present embodiment, the zoom lens continuously movable has been used, but a zoom lens movable in steps may be used instead.

Second Embodiment

In the first embodiment of the presently disclosed subject matter, the stereoscopic effect of the three-dimensional image displayed on the liquid crystal monitor 28 is constantly maintained all the time even if the zoom lens is moved while displaying the live view images, however, the image displayed on the liquid crystal monitor 28 may become dark through the adjustment of the stereoscopic effect, which may deteriorate the visibility.

In a second embodiment of the presently disclosed subject matter, when the brightness of the displayed image, that is, the brightness of the photographed image becomes dark, the image is displayed as the 2D image, thereby reducing an uncomfortable feeling due to the displayed image being darkened. Hereinafter, description will be provided on a monocular stereoscopic imaging device 2 according to the second embodiment. The overall configuration of the imaging device is same as that of the first embodiment; therefore, description thereof will be omitted, and only the operation of the imaging device will now be described. In the description of the operation of the imaging device, the same elements as those of the first embodiment are referred to by the same reference numerals and characters, and description thereof will be omitted.

[Description of Operation of Imaging Device]

Hereinafter, description will be provided on the operation of the monocular stereoscopic imaging device 2. This imaging processing is controlled by the CPU 40. A program for allowing the CPU 40 to execute this imaging processing is stored on the program storage unit in the CPU 40.

Figure 13:
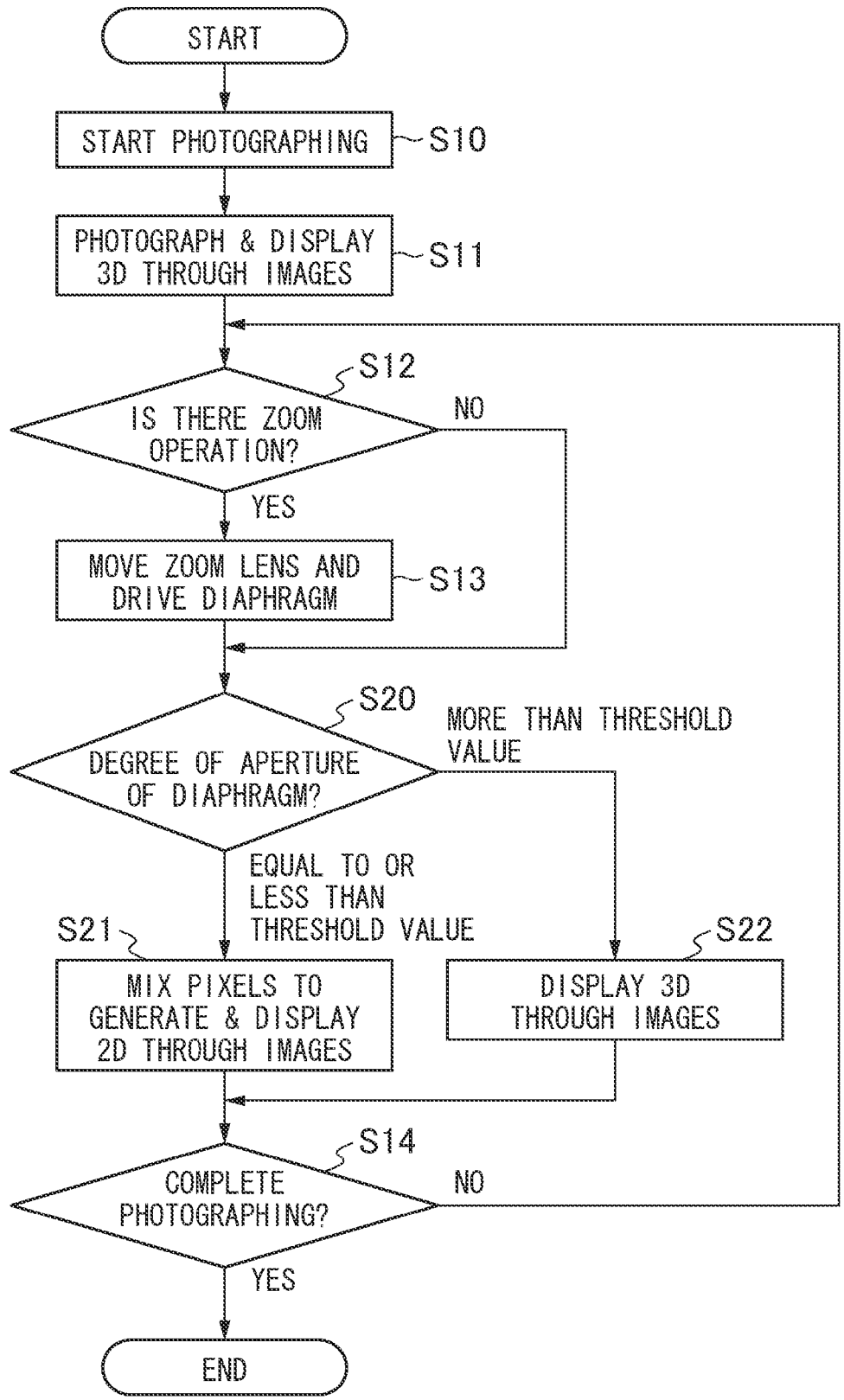
FIG. 13 is a flow chart of the photographing process of the through images in a monocular stereoscopic imaging device 2.

FIG. 13 is a flow chart illustrating a flow of the photographing and displaying processing of the live view images.

In response to an input of an instruction for staring the photographing (step S10), the CPU 40 drives the taking lens 14 and the diaphragm 16 to move to an initial position, so that the light of the object having passed through the taking lens 14 is imaged through the diaphragm 16 on the light receiving surface of the phase-difference CCD 17, and the left-eye image data and the right-eye image data are generated by turns. Brightness/color difference signals are generated from the above generated left-eye image data and the right-eye image, and the generated signals are output to the liquid crystal monitor 28 through the video encoder 66. In this manner, the 3D through images are displayed on the liquid crystal monitor 28 (step S11).

The CPU 40 determines whether or not the zoom operation has been carried out, that is, the instruction for the zoom operation has been input through the operating unit 48 (step S12).

When the zoom operation has been carried out (YES in step S12), the CPU 40 moves the zoom lens through the lens driving unit 47, so as to change the focus distance of the taking lens 14 in accordance with the input from the operating unit 48. In order to maintain the stereoscopic effect before the zoom operation is carried out (step S12), the CPU 40 drives the diaphragm 16 through the diaphragm driving unit 46 based on the relation corresponding to the brightness of the object among the relations between the focus distance and the degree of the aperture, which are stored on the storage area of the CPU 40, and changes the degree of the aperture (step S13).

After the degree of the aperture of the diaphragm 16 is varied (step S13) in accordance with the zoom operation, and when the zoom operation has not been carried out (NO in step S12), the CPU 40 acquires from the AE/AWB detecting unit 44 the integrated value of the G signals of the entire display plane, or the integrated value of the G signals having different weights between the center portion of the display plane and the surrounding portion of the display plane. The CPU 40 calculates the brightness of the object (photographing Ev value) based on the acquired integrated values, and determines whether or not the calculated brightness of the object is smaller than a predetermined threshold value (step S20). A value indicating a lower limit of the brightness of 3D through images which deteriorates the visibility of the image is stored as the threshold value on the storage area of the CPU 40 in advance. The CPU 40 executes the above determination by comparing the photographing Ev value and the threshold value stored on the storage area. The photographing Ev value may be smaller than the threshold value when the degree of the aperture of the diaphragm 16 is decreased more than required for the brightness of the object, that is, for example, when the change in the degree of the aperture of the diaphragm 16 becomes greater although the photographing target is bright, or when the photographing target is dark although the change in the degree of the aperture of the diaphragm 16 is not so great.

When determining that the photographing Ev value is not equal to or less than the predetermined threshold value (NO in step S20), the CPU 40 continues to display the 3D through images in step S11 (step S22).

When determining that the photographing Ev value is equal to or less than the predetermined threshold value, the CPU 40 mixes pixels of the left-eye image data and the right-eye image data obtained from the main pixels and the subpixels so as to generate a single 2D image data; thereby obtaining bright 2D image data. The generated 2D image data is input into the VRAM 50 by turns. The 2D image data is read out from the VRAM 50 by turns, and the 3D image signal processing unit 64 generates the brightness/color difference signals for the 2D image data that has been read out. The brightness/color difference signals are output to the liquid crystal monitor 28 through the video encoder 66 (step S21). In this manner, the 2D through images are displayed on the liquid crystal monitor 28. At this time, no parallax barrier is displayed on the liquid crystal monitor 28.

In step S21, the degree of aperture immediately before the 2D through images are displayed may be retained as the degree of aperture of the aperture of the diaphragm 16, or the degree of aperture may be varied so as to obtain an appropriate exposure.

The CPU 40 determines whether or not an instruction for completing the photographing has been input (step S14). When no instruction for completing the photographing has been input (No in step S14), the CPU 40 executes the processes of step S12 to step S22 once again. When the instruction for completing the photographing has been input (YES in step S14), the CPU 40 completes the process of photographing the through images. The process for the case in which S1 and S2 are switched ON is same as that in the first embodiment, and therefore, description thereof will be omitted.

According to the present embodiment, the 2D image is displayed when the image for display is dark and its visibility is deteriorated, thereby enhancing the visibility. The stereoscopic effect becomes smaller in the 2D image than in the 3D image, thereby it is possible to reduce an uncomfortable feeling of the photographer due to the stereoscopic effect being increased.

The present embodiment has been described by using the example of the photographing and displaying of the live view images, but this embodiment may be applicable to the case of continuously acquiring the right-eye image data and the left-eye image data, such as the case of photographing moving images, as similar to the first embodiment.

Third Embodiment

The variation of the first embodiment of the presently disclosed subject matter has been described by using the example in which the diaphragm 16' whose aperture cannot be varied continuously, thereby the number of the driving steps of the diaphragm becomes smaller than the number of the driving steps of the zoom lens, and the slight variation of the stereoscopic effect is inevitable. In this case, the following operation is repetitively executed: when the zoom lens is moved in the telephoto direction (direction of increasing the focus distance), the aperture of the diaphragm is reduced by one stop before the zoom lens is moved, and thereafter the zoom lens is moved, so as to maintain the stereoscopic effect at a substantially constant level; however, the stereoscopic effect is varied while the zoom lens is moved because of two factors: (1) the variation of the stereoscopic effect due to variation of the incident light flux, and (2) the variation of the stereoscopic effect due to variation of the angle of view.

In the case in which the number of the driving steps of the diaphragm 16' becomes smaller than the number of the driving steps of the zoom lens, thereby the slight variation of the stereoscopic effect is inevitable, the third embodiment of the presently disclosed subject matter carries out a virtual zooming using a digital zoom, thereby reducing the variation of the stereoscopic effect, instead of moving the zoom lens after the aperture of the diaphragm 16' is reduced by one stop. Hereinafter, description will be provided on a monocular stereoscopic imaging device 3 according to the third embodiment. The overall configuration of the imaging device is same as that of the first embodiment; therefore, description thereof will be omitted, and only the operation of the imaging device will now be described. In the description of the operation of the imaging device, the same elements as those of the first embodiment are referred to by the same reference numerals and characters, and description thereof will be omitted.

[Description of Operation of Imaging Device]

Hereinafter, description will be provided on the operation of the monocular stereoscopic imaging device 3. This imaging processing is controlled by the CPU 40. A program for allowing the CPU 40 to execute this imaging processing is stored on the program storage unit in the CPU 40.

Figure 14:
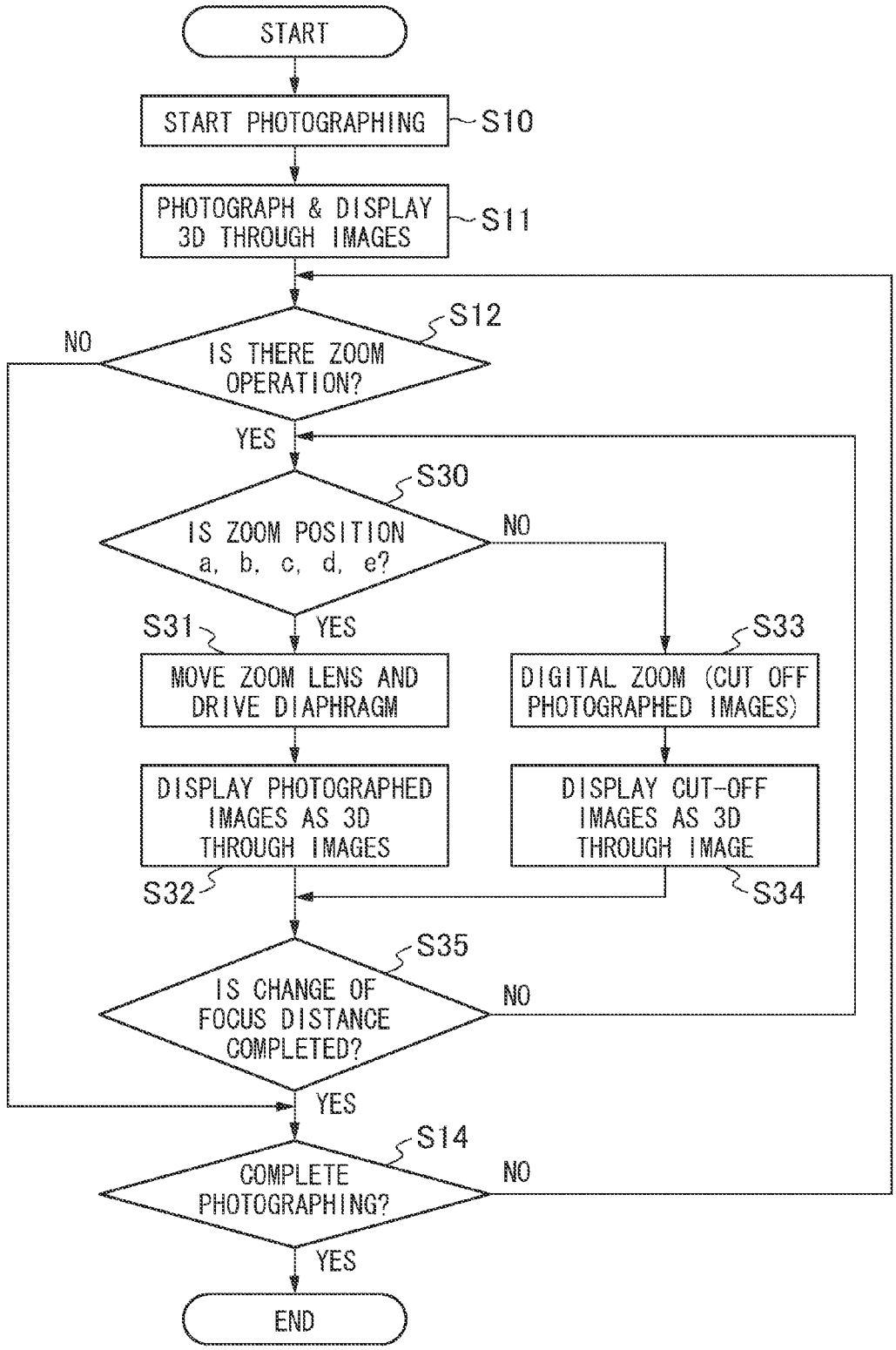
FIG. 14 is a flow chart of the photographing process of the through images in a monocular stereoscopic imaging device 3.

FIG. 14 is a flow chart illustrating a flow of the photographing and displaying processing of the live view images in the monocular stereoscopic imaging device 3.

In response to an input of an instruction for staring the photographing (step S10), the CPU 40 drives the taking lens 14 and the diaphragm 16' to move to an initial position, so that the light of the object having passed through the taking lens 14 is imaged through the diaphragm 16' on the light receiving surface of the phase-difference CCD 17, and the left-eye image data and the right-eye image data are generated by turns. Brightness/color difference signals are generated from the above generated left-eye image data and the right-eye image, and the generated signals are then output to the liquid crystal monitor 28 through the video encoder 66, thereby displaying the 3D through images on the liquid crystal monitor 28 (step S11).

The CPU 40 determines whether or not the zoom operation has been carried out, that is, the instruction for the zoom operation has been input through the operating unit 48 (step S12). When no instruction for the zoom operation has been input (NO in step S12), the CPU 40 shifts the process to step S14.

When the instruction for the zoom operation has been input (YES in step S12), the CPU 40 moves the zoom lens through the lens driving unit 47 until the focus distance becomes equal to the focus distance input as the instruction of zooming. The CPU 40 determines whether or not a next destination of this zoom lens in movement is a position where the focus distance falls under any of positions a, b, c, d, and e in FIG. 15 (step S30).

Figure 15:
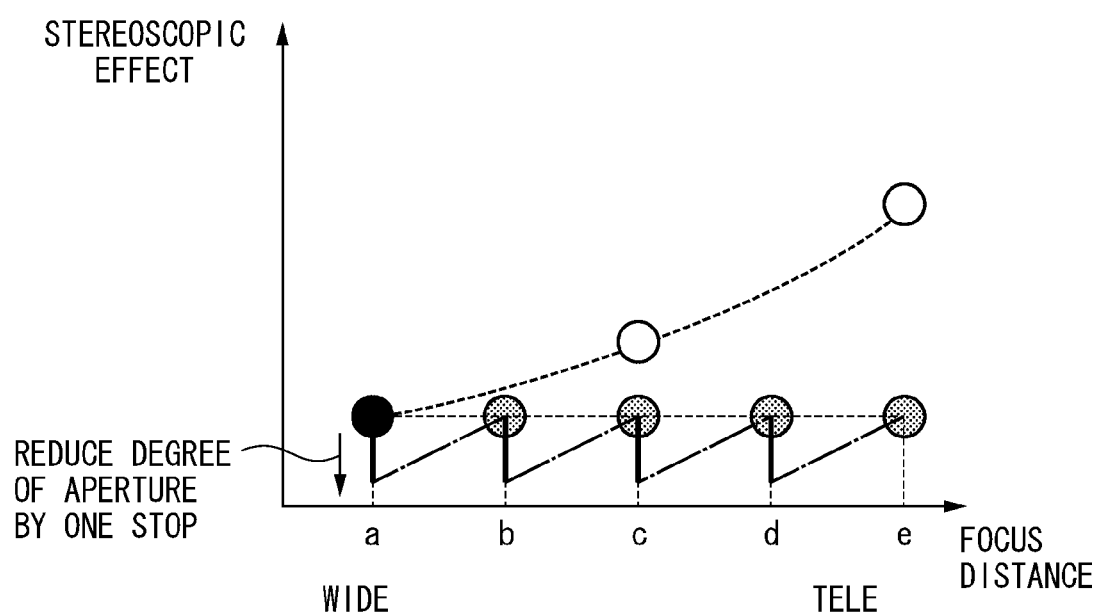
FIG. 15 is a drawing illustrating the relation between the focus distance and the stereoscopic effect, which is used for maintaining the stereoscopic effect at a constant level when the diaphragm has the number of driving steps smaller than the number of driving steps of the zoom lens.

FIG. 15 is a graph illustrating a relation among the stereoscopic effect, the focus distance, and the driving timing of the diaphragm 16', in the case where the number of the driving steps of the diaphragm 16' becomes smaller than that of the zoom lens, and a slight variation of the stereoscopic effect becomes inevitable. The graph shape of FIG. 15 is same as that in FIG. 12.

As described in the variation of the first embodiment, in FIG. 12, the CPU 40 reduces the aperture of the diaphragm 16' by one stop at the focus distance where the stereoscopic effect becomes equal to the stereoscopic effect located at the wide-angle end. The focus distance at any of the points a, b, c, d, and e is a focus distance where the stereoscopic effect becomes equal to the stereoscopic effect located at the wide-angle end.

When the zoom lens is moved to a position where the focus distance is not located at any of the points a, b, c, d, and e in FIG. 15 (NO in step S30), that is, located between the points a and b, between the points b and c, between the points c and d, or between the points d and e, this is not the timing to drive the diaphragm 16' (see the alternate long and short dash lines in FIG. 15). In such a case, the CPU 40 cuts off from the right-eye image data and the left-eye image data predetermined areas having the same angle of view as the angle of view when the zoom lens is moved, and carries out a digital zoom processing to virtually change the focus distance (step S33). In the digital zoom processing, there is no movement of the zoom lens (including the accompanying movement of the focus lens), and thus no variation of the stereoscopic effect is caused by the variation of the incident light flux. The digital zoom processing is a well-known technique, and therefore, the description thereof will be omitted.

As similar to step S11, the areas cut off from the right-eye image data and the left-eye image data in step S33 are three-dimensionally displayed in real time on the liquid crystal monitor 28 (step S34).

When the zoom lens is moved to a position where the focus distance is located at any of the points a, b, c, d, and e in FIG. 15 (YES in step S30), the CPU 40 moves the zoom lens, as well as drives the diaphragm 16' (step S31). When the zoom lens is moved to a position where the focus distance is located between the points a and b, between the points b and c, between the points c and d, or between the points d and e, the digital zoom processing is executed (step S33), therefore, the zoom lens is not actually moved. In step S31, when the zoom lens is located at a position where the focus distance is located at the point a, the zoom lens is moved to a position where the focus distance is located at the point b, as well as the aperture of the diaphragm 16' is reduced by one stop. Similarly, when the zoom lens is located at a position where the focus distance is located at the point b, the zoom lens is moved to a position where the focus distance is located at the point c, as well as the aperture of the diaphragm 16' is reduced by one stop; when the zoom lens is located at a position where the focus distance is located at the point c, the zoom lens is moved to a position where the focus distance is located at the point d, as well as the aperture of the diaphragm 16' is reduced by one stop; and when the zoom lens is located at a position where the focus distance is located at the point d, the zoom lens is moved to a position where the focus distance is located at the point e, as well as the aperture of the diaphragm 16' is reduced by one stop.

The CPU 40 three-dimensionally displays in real time on the liquid crystal monitor 28 the right-eye image data and the left-eye image data photographed in the state after the zoom lens is moved in the same manner as that in step S11 (step S32).

The processes from step S31 to step S34 have been explained by using the example in which the zooming is executed in the direction from the wide-angle end toward the telephoto end, that is, the zoom lens is moved in the direction of increasing the focus distance; but these processes are also executed when the zoom lens is moved from the telephoto end toward the wide-angle end (in the direction of decreasing the focus distance). Specifically, when the zoom lens is moved at a position where the focus distance is located between the points a and b, between the points b and c, between the points c and d, or between the points d and e, the digital zoom processing is executed (step S33), and the image after the digital zoom processing is carried out is displayed (step S34).

When the zoom lens is moved to a position where the focus distance is located at any of the points a, b, c, d, and e in FIG. 15 (YES in step S30), the CPU 40 moves the zoom lens as well as drives the diaphragm 16' (step S31), and displays the photographed image (step S32). Specifically, when the zoom lens is located at a position where the focus distance is located at the point e, the zoom lens is moved to a position where the focus distance is located at the point d, as well as the aperture of the diaphragm 16' is increased by one stop; when the zoom lens is located at a position where the focus distance is located at the point d, the zoom lens is moved to a position where the focus distance is located at the point c, as well as the aperture of the diaphragm 16' is increased by one stop; when the zoom lens is located at a position where the focus distance is located at the point c, the zoom lens is moved to a position where the focus distance is located at the point b, as well as the aperture of the diaphragm 16' is increased by one stop; and when the zoom lens is located at a position where the focus distance is located at the point b, the zoom lens is moved to a position where the focus distance is located at the point a, as well as the aperture of the diaphragm 16' is increased by one stop (step S31).

As a result from the execution of step S31 to step S34, the CPU 40 determines whether or not the zooming has been carried out until the focus distance becomes equal to the focus distance input as the instruction of the zooming (step S35). When the zooming is not completed yet (NO in step S35), the processes from the S30 to the S35 are executed once again. The processes from step S31 to step S35 are repetitively executed in this manner, thereby carrying out the zooming at the position defined as instructed.

When the zooming is completed (YES in step S35), the CPU 40 determines whether or not an instruction for completing the photographing has been input (step S14). When no instruction for completing the photographing has been input (NO in step S14), the CPU 40 executes the processes from step S12 to step S35 once again, and when the instruction for completing the photographing has been input (YES in step S14), the CPU 40 completes the photographing processing of the through images. The process for the case in which S1 and S2 are switched ON is same as that in the first embodiment, and therefore, description thereof will be omitted.

According to the present embodiment, of two factors that affect the variation of the stereoscopic effect: (1) the variation of the stereoscopic effect due to variation of the incident light flux; and (2) the variation of the stereoscopic effect due to variation of the angle of view, it is possible to eliminate the factor (1). Consequently, in the case where the number of the driving steps of the diaphragm is smaller than that of the zoom lens, and thereby the slight variation of the stereoscopic effect becomes inevitable, it is possible to reduce an uncomfortable feeling of the photographer.

The present embodiment has been described by using the example of the photographing and displaying of the live view images, but this embodiment may be applicable to the case of photographing moving images, for example, when the right-eye image data and the left-eye image data are continuously acquired, as similar to the first embodiment.

The first to third embodiments have been described by using the example of employing the CCD as the image sensor, but the presently disclosed subject matter is not limited to this. The presently disclosed subject matter may be applicable to other image sensors such as a CMOS (complementary metal-oxide semiconductor), or the like.

The first to third embodiments have been explained by using the example of the monocular stereoscopic imaging device for dividing the light flux with the light shielding members 17A, 17B provided on the microlens L side of the phase-difference CCD 17, but the presently disclosed subject matter may be applicable to a monocular stereoscopic imaging device using a taking lens 12' including a relay lens for dividing the light flux. The presently disclosed subject matter may also be applicable to such an imaging device that uses a single microlens for two types of pixels (main pixels and subpixels), thereby limiting the incident light flux from entering each type of the pixels.

What is claimed is:

1. A monocular stereoscopic imaging device comprising:
   an imaging optical system including a taking lens including a zoom lens, and a diaphragm which forms a single aperture;
   a single imaging unit configured to continuously acquire a first image and a second image based on image signals output from an imaging sensor including a first pixel group and a second pixel group on which an image of a subject passed through a first area of the taking lens and an image of the subject passed through a second area of the taking lens are formed respectively;
   a diaphragm driving unit configured to change a degree of an aperture of the single aperture of the diaphragm; and
   a controlling unit configured to acquire an instruction of changing a focus distance, configured to drive the diaphragm through the diaphragm driving unit so as to increase the degree of the aperture when the zoom lens is moved in a direction of decreasing the focus distance in accordance with the acquired instruction of changing the focus distance.

2. The monocular stereoscopic imaging device according to claim 1, wherein the controlling unit drives the diaphragm through the diaphragm driving unit so as to reduce the degree of the aperture when the zoom lens is moved in a direction of increasing the focus distance.

3. The monocular stereoscopic imaging device according to claim 1,
wherein the controlling unit controls the diaphragm driving unit to minimize the degree of the aperture when the zoom lens is located at a telephoto end.

4. The monocular stereoscopic imaging device according to claim 1,
wherein the controlling unit controls the diaphragm driving unit to maximize the degree of the aperture when the zoom lens is located at a wide-angle end.

5. The monocular stereoscopic imaging device according to claim 1, wherein
the diaphragm can be driven so as to change the degree of the aperture in n steps (n is a natural number equal to or greater than 2),
the zoom lens can be driven so as to change the focus distance in m steps (m is a natural number equal to or greater than 2), m being greater than the n, and
the controlling unit performs control to reduce the aperture of the diaphragm by one step before the zoom lens is moved when the instruction of changing the focus distance in the direction of increasing the focus distance is input through an input unit, and to reduce the aperture of the diaphragm by one step every time the zoom lens is moved by a predetermined number of steps.

6. The monocular stereoscopic imaging device according to claim 5,
wherein the controlling unit limits the driving steps of the zoom lens to be the n steps of the m steps, and performs control to synchronously drive the diaphragm and the zoom lens.

7. The monocular stereoscopic imaging device according to claim 5, further comprising a digital zoom unit configured to cut off predetermined areas from the acquired images, and configured to electronically change the focus distance,
wherein the controlling unit controls the digital zoom unit to virtually change the focus distance through the digital zoom unit, instead of moving the zoom lens.

8. The monocular stereoscopic imaging device according to claim 1, further comprising
a storage unit configured to store a relation between the degree of the aperture of the diaphragm and the focus distance,
wherein the controlling unit controls the diaphragm driving unit based on the relation between the degree of the aperture and the focus distance stored on the storage unit.

9. The monocular stereoscopic imaging device according to claim 1, further comprising:
a two-dimensional image generating unit configured to synthesize the acquired images when brightnesses of the acquired images are equal to or less than a predetermined value, so as to generate a two-dimensional image;
a display unit configured to display the two-dimensional image; and
a display controlling unit configured to display the generated two-dimensional image on the display unit when the two-dimensional image is generated by the two-dimensional image generating unit.

10. The monocular stereoscopic imaging device according to claim 1, further comprising:
a display unit configured to recognizably display the acquired images as a three-dimensional image; and
a display controlling unit configured to three-dimensionally display on the display unit the images continuously acquired.

11. A method of controlling a monocular stereoscopic imaging device comprising:
an imaging optical system including a taking lens including a zoom lens, and a diaphragm which forms a single aperture;
a single imaging unit configured to continuously acquire a first image and a second image based on image signals output from an imaging sensor including a first pixel group and a second pixel group on which an image of a subject passed through a first area of the taking lens and an image of the subject passed through a second area of the taking lens are formed respectively; and
a diaphragm driving unit configured to change a degree of an aperture of the single aperture of the diaphragm, the method comprising:
acquiring an instruction of changing a focus distance; and
driving the diaphragm through the diaphragm driving unit so as to increase the degree of the aperture when the zoom lens is moved in a direction of decreasing the focus distance in accordance with the acquired instruction of changing the focus distance.

12. The method according to claim 11, further comprising driving the diaphragm through the diaphragm driving unit so as to reduce the degree of the aperture when the zoom lens is moved in a direction of increasing the focus distance.

* * * * *